United States Patent
Oya et al.

(10) Patent No.: US 10,761,513 B2
(45) Date of Patent: Sep. 1, 2020

(54) INFORMATION PROCESSING DEVICE, INFORMATION PROCESSING METHOD, AND NON-TRANSITORY COMPUTER-READABLE RECORDING MEDIUM

(71) Applicant: OMRON Corporation, Kyoto (JP)

(72) Inventors: Taku Oya, Kyoto (JP); Haruna Shimakawa, Kyoto (JP); Yoshihide Tamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 232 days.

(21) Appl. No.: 15/892,432

(22) Filed: Feb. 9, 2018

(65) Prior Publication Data

US 2019/0049924 A1    Feb. 14, 2019

(30) Foreign Application Priority Data

Aug. 10, 2017    (JP) .................................. 2017-154937

(51) Int. Cl.
*G05B 19/042*    (2006.01)
*G05B 19/418*    (2006.01)

(52) U.S. Cl.
CPC ....... *G05B 19/418* (2013.01); *G05B 19/0426* (2013.01); *G05B 2219/23256* (2013.01); *G05B 2219/23283* (2013.01); *G05B 2219/34396* (2013.01)

(58) Field of Classification Search
None
See application file for complete search history.

(56) References Cited

U.S. PATENT DOCUMENTS

| | | | | |
|---|---|---|---|---|
| 5,254,923 A | * | 10/1993 | Kanitani | ................... B25J 9/009 |
| | | | | 318/568.11 |
| 5,485,620 A | * | 1/1996 | Sadre | ............... G05B 19/41865 |
| | | | | 700/18 |

(Continued)

FOREIGN PATENT DOCUMENTS

| EP | 1452969 | 9/2004 |
|---|---|---|
| JP | 2016042378 | 3/2016 |

OTHER PUBLICATIONS

"Search Report of European Counterpart Application," dated Aug. 13, 2018, p. 1-p. 8.

*Primary Examiner* — Thomas C Lee
*Assistant Examiner* — Gary Collins
(74) *Attorney, Agent, or Firm* — JCIPRNET

(57) ABSTRACT

An information processing device includes an actuator emulator that simulates a behavior of a drive apparatus that is for driving a first control target, an actuator emulator that simulates a behavior of a drive apparatus that is for driving a second control target that cooperates with the first control target, a timer that generates a virtual time, and an execution part that executes a PLC program for controlling the actuator emulator and a robot program for controlling the actuator emulator. Execution modes of the control programs used by the execution part include a synchronous execution mode in which the PLC program and the robot program are synchronously executed in accordance with a virtual time and an asynchronous execution mode in which the PLC program and the robot program are asynchronously executed.

20 Claims, 14 Drawing Sheets

(56) References Cited

U.S. PATENT DOCUMENTS

| | | | | |
|---|---|---|---|---|
| 6,625,498 B1* | 9/2003 | Kurakake | ............ | G05B 19/0421 |
| | | | | 700/19 |
| 2002/0046397 A1* | 4/2002 | Schmitt | ................ | G05B 19/056 |
| | | | | 717/125 |
| 2004/0230955 A1* | 11/2004 | Pugh | ....................... | G06F 9/454 |
| | | | | 717/124 |
| 2006/0287769 A1* | 12/2006 | Yanagita | ................ | B25J 9/1669 |
| | | | | 700/245 |
| 2007/0044066 A1* | 2/2007 | Meijer | ..................... | G06F 8/33 |
| | | | | 717/100 |
| 2013/0218307 A1* | 8/2013 | Hoernicke | ............. | G05B 17/02 |
| | | | | 700/81 |
| 2016/0124412 A1* | 5/2016 | Fujita | ................ | H04L 12/40019 |
| | | | | 700/3 |

* cited by examiner

INFORMATION PROCESSING DEVICE, INFORMATION PROCESSING METHOD, AND NON-TRANSITORY COMPUTER-READABLE RECORDING MEDIUM

CROSS-REFERENCE TO RELATED APPLICATION

This application claims the priority benefit of Japan application serial no. 2017-154937, filed on Aug. 10, 2017. The entirety of the above-mentioned patent application is hereby incorporated by reference herein and made a part of this specification.

TECHNICAL FIELD

The disclosure relates to a technology for synchronously executing different types of control programs.

BACKGROUND ART

Various factory automation (FA) systems have been developed to automate workpiece production procedures. Each of these FA systems includes, for example, a table for moving workpieces, a conveyor system for transporting workpieces, an arm robot for moving workpieces to a predetermined movement destination, and the like. Control targets such as tables, conveyor systems, arm robots, and the like will also be referred to as "transportation devices" below. These transportation devices are controlled by controllers such as programmable logic controllers (PLC) or robot controllers.

Normally, an architect checks whether a designed control program operates in a simulation as intended and then writes the control program into a controller. With regard to a technology for supporting such a simulation, Patent Document 1 discloses a simulation device that includes visual sensors to realize an integrated simulation.

Patent Documents

[Patent Document 1] Japanese Patent Application Laid-Open (JP-A) No. 2016-42378

In recent years, controllers for synchronously driving various transportation devices have been developed. Accordingly, for example, an arm robot can pick up a workpiece placed on a table or the like while the table is moving.

Such control programs of various transportation devices may be written using different types of programming language in accordance with types of the transportation devices. The simulation device disclosed in Patent Document 1 does not simulate operations of different types of control program.

There is a need for synchronously and asynchronously executing different types of control program. By synchronously executing various control programs, an architect can simulate operations of the various control programs more precisely or can debug the various control programs more accurately. On the other hand, by asynchronously executing various control programs, an architect can reach a target simulation line or a debugging line of a program earlier. It is desired to execute different types of program synchronously or asynchronously as described above depending on a situation.

SUMMARY

According to an embodiment of the disclosure, an information processing device includes a first actuator emulator that simulates a behavior of a drive apparatus that is for driving a first control target, a second actuator emulator that simulates a behavior of a drive apparatus that is for driving a second control target that cooperates with the first control target, a timer for generating a virtual time, and an execution part for executing a first control program for controlling a first actuator emulator and a second control program for controlling a second actuator emulator. The second control program is written in a different type of programming language from that of the first control program. Execution modes for the control programs used by the execution part include a synchronous execution mode in which the first control program and the second control program are synchronously executed in accordance with the virtual time and an asynchronous execution mode in which the first control program and the second control program are asynchronously executed.

According to an embodiment of the disclosure, an information processing method includes a step of generating a virtual time, and a step of executing a first control program for controlling a first actuator emulator that simulates a behavior of a drive apparatus that is for driving a first control target and a second control program for controlling a second actuator emulator that simulates a behavior of a drive apparatus that is for driving a second control target that cooperates with the first control target. The second control program is described in a different type of programming language from that of the first control program. Execution modes for the control programs used in the execution step include a synchronous execution mode in which the first control program and the second control program are synchronously executed in accordance with the virtual time and an asynchronous execution mode in which the first control program and the second control program are asynchronously executed.

According to an embodiment of the disclosure, an information processing program causes a computer to execute a step of generating a virtual time and a step of executing a first control program for controlling a first actuator emulator that simulates a behavior of a drive apparatus that is for driving a first control target and a second control program for controlling a second actuator emulator that simulates a behavior of a drive apparatus that is for driving a second control target that cooperates with the first control target. The second control program is described in a different type of programming language from that of the first control program. Execution modes for the control programs used in the execution step include a synchronous execution mode in which the first control program and the second control program are synchronously executed in accordance with the virtual time and an asynchronous execution mode in which the first control program and the second control program are asynchronously executed.

DESCRIPTION OF THE EMBODIMENTS

Figure 1:
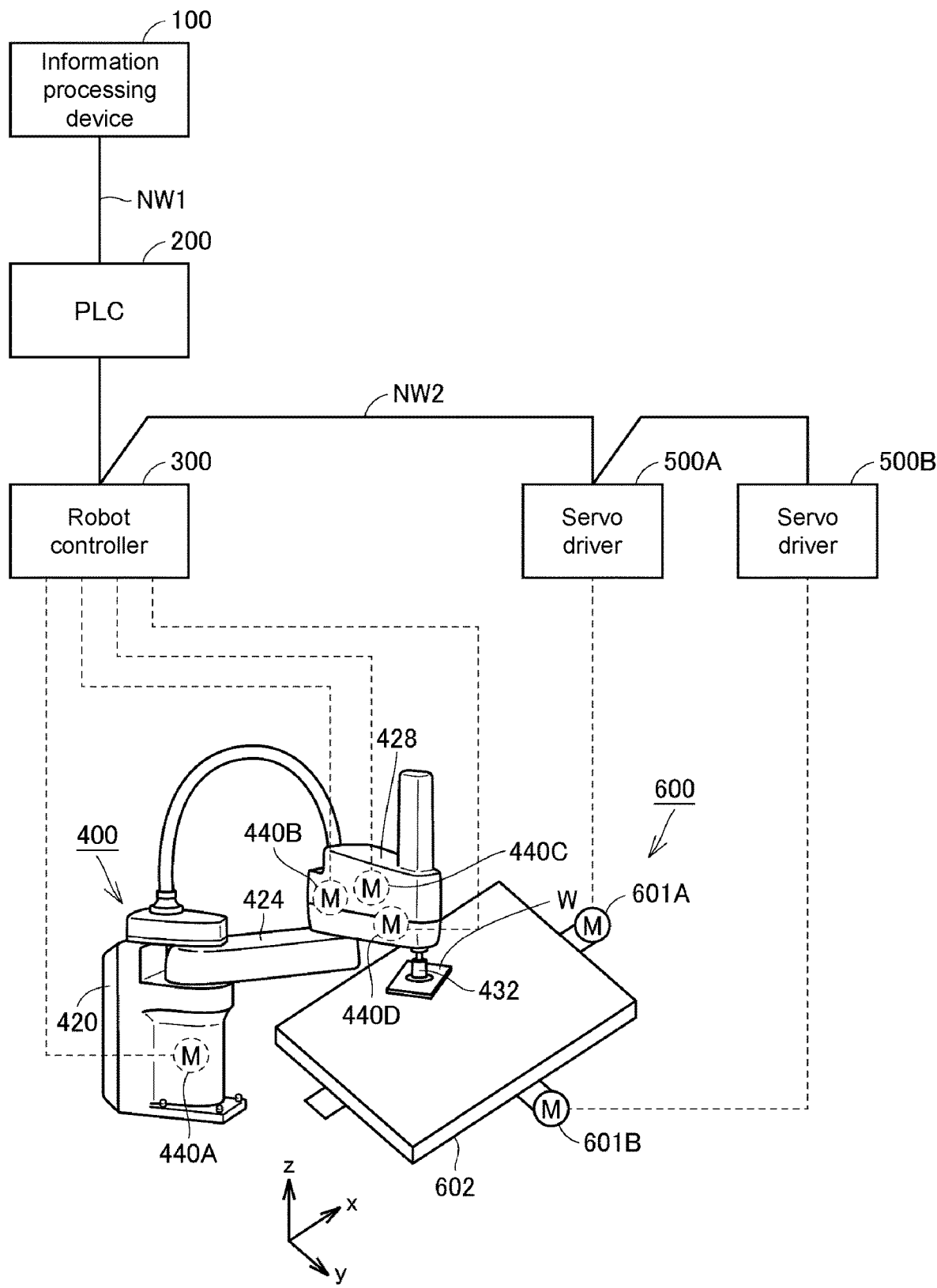
FIG. 1 is a diagram showing an example of a system configuration of an FA system according to an embodiment.

According to an embodiment of the disclosure, the information processing device further includes a display part for displaying an editing screen of the first control program and the second control program. The editing screen is set such that a break point can be designated for an instruction group included in the first control program and an instruction group included in the second control program. The execution part temporarily stops the execution of the first control program and the second control program based on the fact that an execution timing of an instruction designated by the break point has arrived.

According to an embodiment of the disclosure, the execution part executes the first control program and the second control program in the synchronous execution mode until the instruction designated by the break point is executed after the execution of the first control program and the second control program is started.

According to an embodiment of the disclosure, the editing screen is set such that one of the synchronous execution mode and the asynchronous execution mode can be selected during a temporary stop of the execution of the first control program and the second control program.

According to an embodiment of the disclosure, in a case in which the asynchronous execution mode is selected during a temporary stop of the execution of the first control program and the second control program, the editing screen enables the first control program and the second control program to be individually subject to step-by-step execution.

According to an embodiment of the disclosure, the first control program and the second control program include a shared variable that is shared between the programs. The editing screen can receive an operation of changing the shared variable during the temporary stop of the execution of the first control program and the second control program or during the execution of the first control program and the second control program.

According to an embodiment of the disclosure, at least one of the first control program and the second control program includes a synchronous instruction that is executed in synchronization with the other control program. The editing screen can receive an operation of invalidating the synchronous instruction during the temporary stop of the execution of the first control program and the second control program or during the execution of the first control program and the second control program.

According to an embodiment of the disclosure, the first control program is a cyclic execution type program. The second control program is a sequential execution type program.

According to an embodiment to the disclosure, different types of control program can be executed synchronously or asynchronously depending on a situation.

Each embodiment of the disclosure will be described below with reference to the drawings. The same reference numerals will be given to the same components and constituent elements in the following description. The same applies to names and functions thereof. Therefore, detailed description thereof will not be repeated.

[A. Configuration of FA System]

The disclosure relates to a technology for synchronously simulating transportation devices of different types constituting an FA system. To facilitate understanding, an example of an FA system that is a simulation target will be described with reference to FIG. 1 before a synchronous simulation is described. FIG. 1 is a diagram showing an example of a system configuration of an FA system 1.

The FA system 1 includes an information processing device 100, a programmable logic controller (PLC) 200, a robot controller 300, an arm robot 400, servo drivers 500A and 500B, and a moving table 600.

For convenience of description, a predetermined direction on a horizontal plane will also be referred to as an x direction below. In addition, a direction orthogonal to the x direction on the horizontal plane will also be referred to as a y direction. A direction orthogonal to the x and y directions will also be referred to as a z direction. That is, the z direction corresponds to the vertical direction.

The information processing device 100 provides an architect a development environment for designing control programs for the PLC 200 and the robot controller 300. The information processing device 100 is a support device, for example, a personal computer (PC), a tablet terminal, a smartphone, or the like. The information processing device 100 and the PLC 200 are connected to each other by a field network NW1. Ethernet (registered trademark), for example, can be employed for the field network NW1. However, the field network NW1 is not limited to Ethernet, and an arbitrary communication scheme can be employed. For example, the information processing device 100 and the PLC 200 may be directly connected to each other by a signal line.

The PLC 200, the robot controller 300, and the servo drivers 500A and 500B are connected to each other by a field network NW2 through a daisy chain. EtherCAT (registered trademark), for example, can be employed for the field network NW2. However, the field network NW2 is not limited to EtherCAT, and an arbitrary communication scheme can be employed.

The arm robot 400 is, for example, a SCARA robot. The arm robot 400 is constituted by a base 420, a first arm 424, a second arm 428, and an end-effector 432. The first arm 424 is connected to the base 420, and is rotatably driven by a servo motor 440A on an x-y plane having their connection point as a rotation axis. The second arm 428 is connected to the first arm 424 and is rotatably driven by a servo motor 440B on the x-y plane having their connection point as a rotation axis. The end-effector 432 is connected to the second arm 428, can be driven by a servo motor 440C in the z direction, and is rotatable by a servo motor 440D.

The servo motors 440A to 440D will also be referred to as servo motors 440 below. The robot controller 300 has a plurality of servo drivers (not illustrated) built thereinto, and each of the servo drivers controls its corresponding servo motor 440. An encoder (not illustrated) is provided on the rotation axis of each of the servo motors 440. The encoders provide feedback on positions (rotation angles) of the servo motors 440, rotational speeds of the servo motors 440, cumulative rotational speeds of the servo motors 440, and the like to the corresponding servo drivers. Note that the servo drivers need not necessarily be built into the robot controller 300, and may be provided separately from the robot controller 300.

The end-effector 432 is, for example, a pick-up tool for a workpiece W. The workpiece W is a product or a half-finished product. The end-effector 432 picks up the workpiece W by attracting the workpiece using suction power as an example. Note that, the arm robot 400 may pick up the workpiece W by gripping the workpiece W.

The moving table 600 includes servo motors 601A and 601B, and an installation stand 602 for the workpiece W. The servo motor 601A is controlled by the servo driver 500A and thereby drives the installation stand 602 in the x axis direction. The servo motor 601B is controlled by the servo driver 500B and thereby drives the installation stand 602 in the y axis direction. The installation stand 602 is driven to an arbitrary position on the x-y plane due to cooperative driving of the servo motors 601A and 601B.

The servo drivers 500A and 500B will also be referred to collectively as servo drivers 500, and the servo motors 601A and 601B will also be referred to collectively as servo motors 601 below. The servo drivers 500 control corresponding servo motors 601 thereof. An encoder (not illustrated) is provided on a rotation axis of each of the servo motors 601. The encoders give feedback on positions (rotational angles), rotational speeds, cumulative rotational speeds, and the like of the servo motors to the servo drivers 500.

The arm robot 400 and the moving table 600 are synchronously driven due to a cooperative operation of the PLC 200 and the robot controller 300. As a result, for example, the arm robot 400 can pick up the workpiece W placed on the installation stand 602 or the like while the moving table 600 is moving.

[B. Virtual FA System]

The information processing device 100 according to the present embodiment uses an emulator group for simulating the behavior of apparatuses included in the real FA system 1 in order to simulate operations of the FA system 1 shown in FIG. 1. The emulators mentioned here refer to programs that can reproduce the behavior of the apparatuses included in the FA system 1. By precisely simulating the behavior of the apparatuses included in the FA system 1 by each of the emulators, the information processing device 100 can precisely simulate operations of the real FA system 1.

Figure 2:
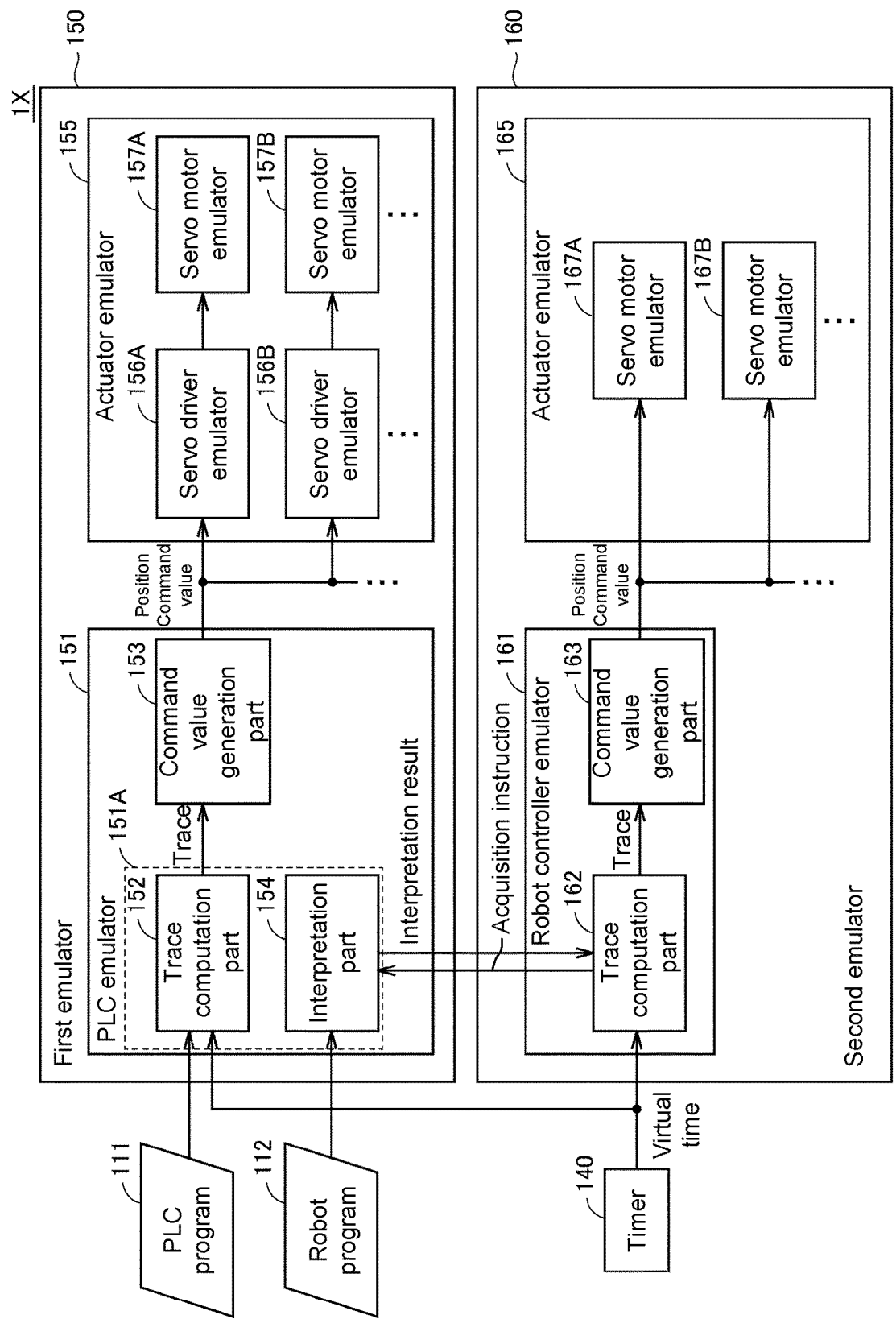
FIG. 2 is a diagram showing an example of a configuration of a virtual FA system according to an embodiment.
Figure 3:
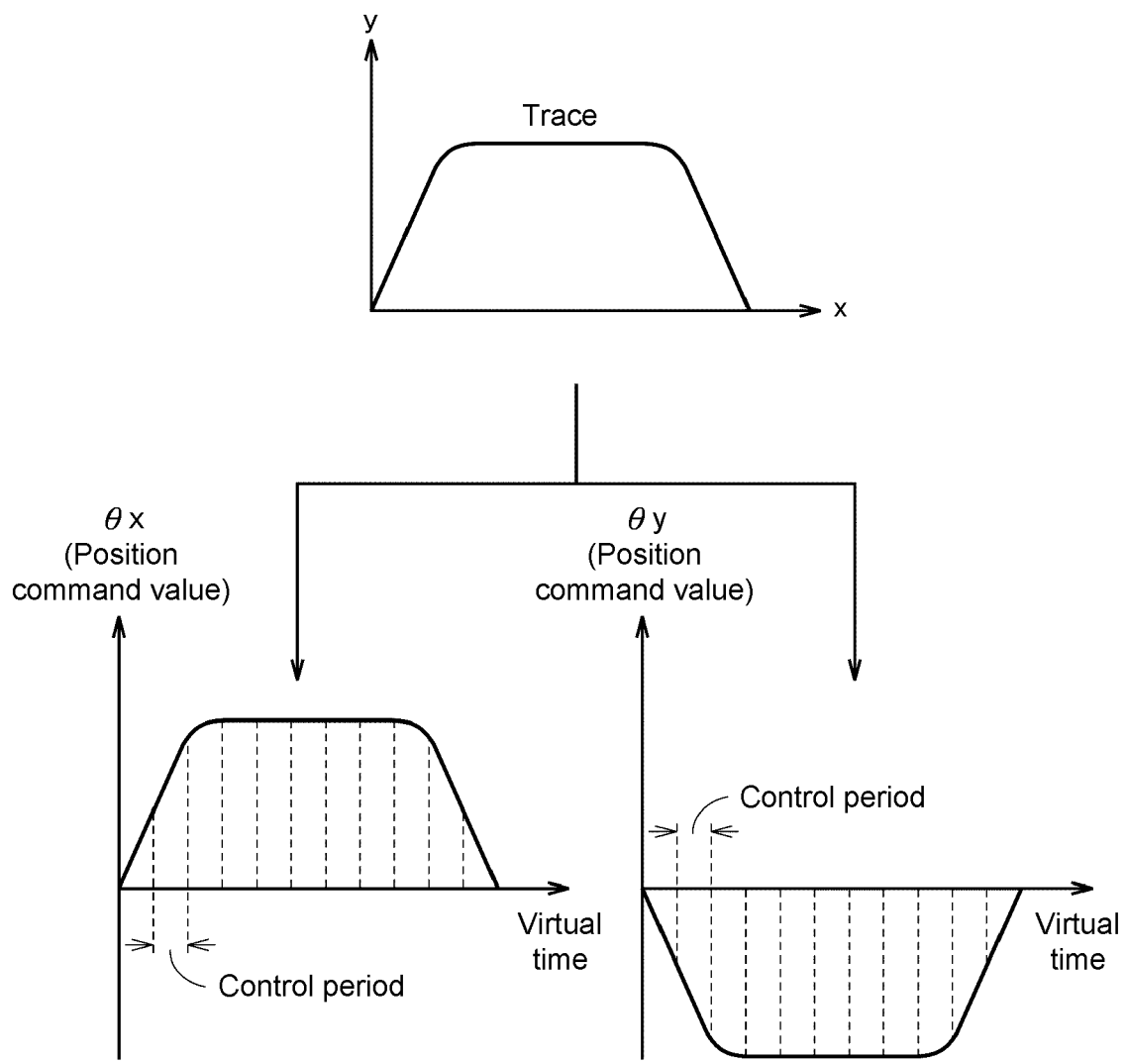
FIG. 3 shows exemplary graphs of generated traces.

A virtual FA system 1X constituted by emulators will be described below with reference to FIG. 2 and FIG. 3. FIG. 2 is a diagram showing an example of a configuration of the virtual FA system 1X.

As shown in FIG. 2, the virtual FA system 1X includes a timer 140 for generating virtual times, a first emulator 150, and a second emulator 160.

The first emulator 150 is constituted by a PLC emulator 151 that simulates the behavior of the PLC 200 and an actuator emulator 155 that simulates the behavior of the drive apparatuses of the moving table 600. The PLC emulator 151 is constituted by a command value generation part 153. The actuator emulator 155 is constituted by servo driver emulators 156A and 156B for simulating the behavior of the servo drivers 500A and 500B (refer to FIG. 1) and servo motor emulators 157A and 157B for simulating the behavior of the servo motors 601A and 601B (refer to FIG. 1).

An execution part 151A executes a PLC program 111 (a first control program) for controlling the actuator emulator 155 (a first actuator emulator) and a robot program 112 (a second control program) for controlling the actuator emulator 165 (a second actuator emulator). Execution Modes for the control programs used by the execution part 151A include a "synchronous execution mode" in which the PLC program 111 and the robot program 112 are synchronously executed in accordance with a virtual time generated by the timer 140 and an "asynchronous execution mode" in which the PLC program 111 and the robot program 112 are asynchronously executed. Details of the synchronous execution mode and the asynchronous execution mode will be described below.

The execution part 151A is constituted by a trace computation part 152 and an interpretation part 154. The trace computation part 152 reads the PLC program 111 for driving the actuator emulator 155 in a simulation and then generates a trace for driving the actuator emulator 155. The PLC program 111 is described in a cyclic execution type programming language, for example, a ladder language or a structured text language. Cyclic execution type is an execution form in which an instruction group included in a program is repeatedly executed in each of predetermined control periods. That is, the trace computation part 152 repeatedly executes an instruction group included in the PLC program 111 in each predetermined control period (a first control period). A virtual time generated by the timer 140 is a measure of a control period.

The PLC program 111 includes a movement instruction for moving the moving table 600 to a target position. When the movement instruction included in the PLC program 111 is executed, the trace computation part 152 generates a trace for the actuator emulator 155 moving a control target in a simulation. The trace is generated on the basis of, for example, a current position of an object to be driven and a target position included in the movement instruction. FIG. 3 shows graphs showing an example of generated traces. Although traces on the x-y plane are shown in the example of FIG. 3, a generated trace may be one-dimensional or three-dimensional. The generated trace is output to the command value generation part 153. The trace computation part 152 transmits an interpretation instruction of the next instruction to the interpretation part 154 on the basis of the fact that a position of the arm robot driven by the actuator emulator 165 has reached the target position.

The command value generation part 153 generates position command values to be output to the actuator emulator 155 in accordance with the generated trace. The position command value is a control value for driving the servo motor emulators 157A and 157B in a simulation, and denotes, for example, a rotational angle, a rotational speed, a position, or the like. In the example of FIG. 3, the command value generation part 153 generates a rotational angle $\theta x$ for the servo motor emulator 157A and a rotational angle $\theta y$ for the servo motor emulator 157B as position command values in each control period. The corresponding rotational angles $\theta x$ and $\theta y$ are sequentially output to the servo motor emulators 157A and 157B in accordance with a current virtual time.

The servo driver emulators 156A and 156B drive the servo motor emulators 157A and 157B in a simulation in accordance with the position command values output from the command value generation part 153.

The second emulator 160 is constituted by a robot controller emulator 161 that simulates the behavior of the robot controller 300 and an actuator emulator 165 that simulates the behavior of the drive apparatuses of the arm robot 400. The robot controller emulator 161 is constituted by a trace computation part 162 and a command value generation part 163. The actuator emulator 165 is constituted by servo motor emulators 167A and 167B that simulate the behavior of the servo motors 440A and 440B shown in FIG. 1.

The interpretation part 154 executes the robot program 112. The robot program 112 includes an instruction group for driving the actuator emulator 165 (the second actuator emulator) in a simulation. The robot program 112 is described in a sequential execution type robot programming language. Sequential execution type refers to an execution form in which an instruction group included in a program is sequentially executed in accordance with a predetermined execution order. That is, the interpretation part 154 sequentially executes the instruction group included in the robot program 112 (the second control program) in a predetermined execution order. The execution of the instruction group is performed in accordance with virtual times generated by the timer 140. In the example of FIG. 2, the interpretation part 154 interprets the instruction group included in the robot program 112 in a predetermined execution order, and sequentially outputs the interpretation results to the robot controller emulator 161.

When an interpretation result output from the interpretation part 154 indicates a movement instruction, the trace computation part 162 generates a trace for the actuator emulator 165 moving the control target in a simulation. The trace is generated on the basis of a current position of the object to be driven and a target position included in the movement instruction. The generated trace is output to the command value generation part 163.

The command value generation part 163 generates position command values to be output to the actuator emulator 165 in accordance with the trace output from the trace computation part 162. The position command value is a control value for driving the servo motor emulators 167A and 167B in a simulation, and denotes, for example, a virtual rotational angle, rotational speed, position, or the like of the servo motor emulators 167A and 167B. Since the method for generating position command values for the actuator emulator 165 is the same as the method for generating position command values for the actuator emulator 155, description thereof will not be repeated.

The servo motor emulators 167A and 167B are driven in a simulation in accordance with the position command values output from the command value generation part 163. Note that the actuator emulator 165 may include a servo driver emulator like the actuator emulator 155.

Note that, although the PLC program 111 and the robot program 112 are exemplified above, control programs to be executed by the information processing device 100 are not limited to the PLC program 111 and the robot program 112. Arbitrary control programs are employed as the control programs as long as the control programs may be written in different types of programming language.

[C. Editing Screen 125]

An editing screen 125 for editing the PLC program 111 and the robot program 112 will be described with reference to FIG. 4 to FIG. 7. FIG. 4 to FIG. 7 show examples of the editing screen 125 for the PLC program 111 and the robot program 112.

The editing screen 125 includes an editing area 120A for the PLC program 111, an editing area 120B for the robot program 112, and an execution mode display area 121 for showing a current execution mode. The editing areas 120A and 120B are displayed on one screen side by side. Accordingly, an architect can design the PLC program 111 and the robot program 112 in parallel.

Figure 6:
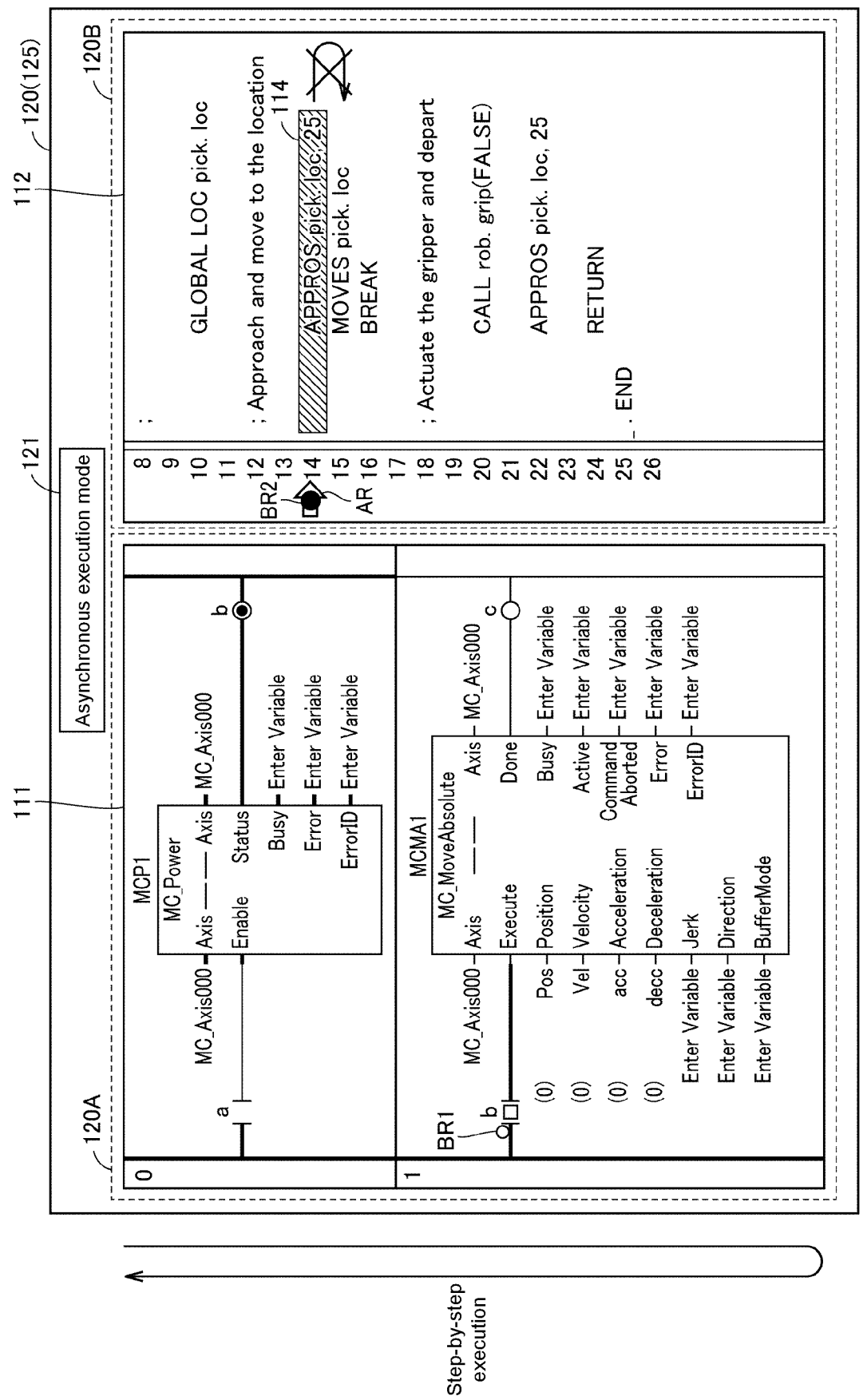
FIG. 6 is a diagram showing an example of the editing screen of the PLC program and the robot program.
Figure 7:
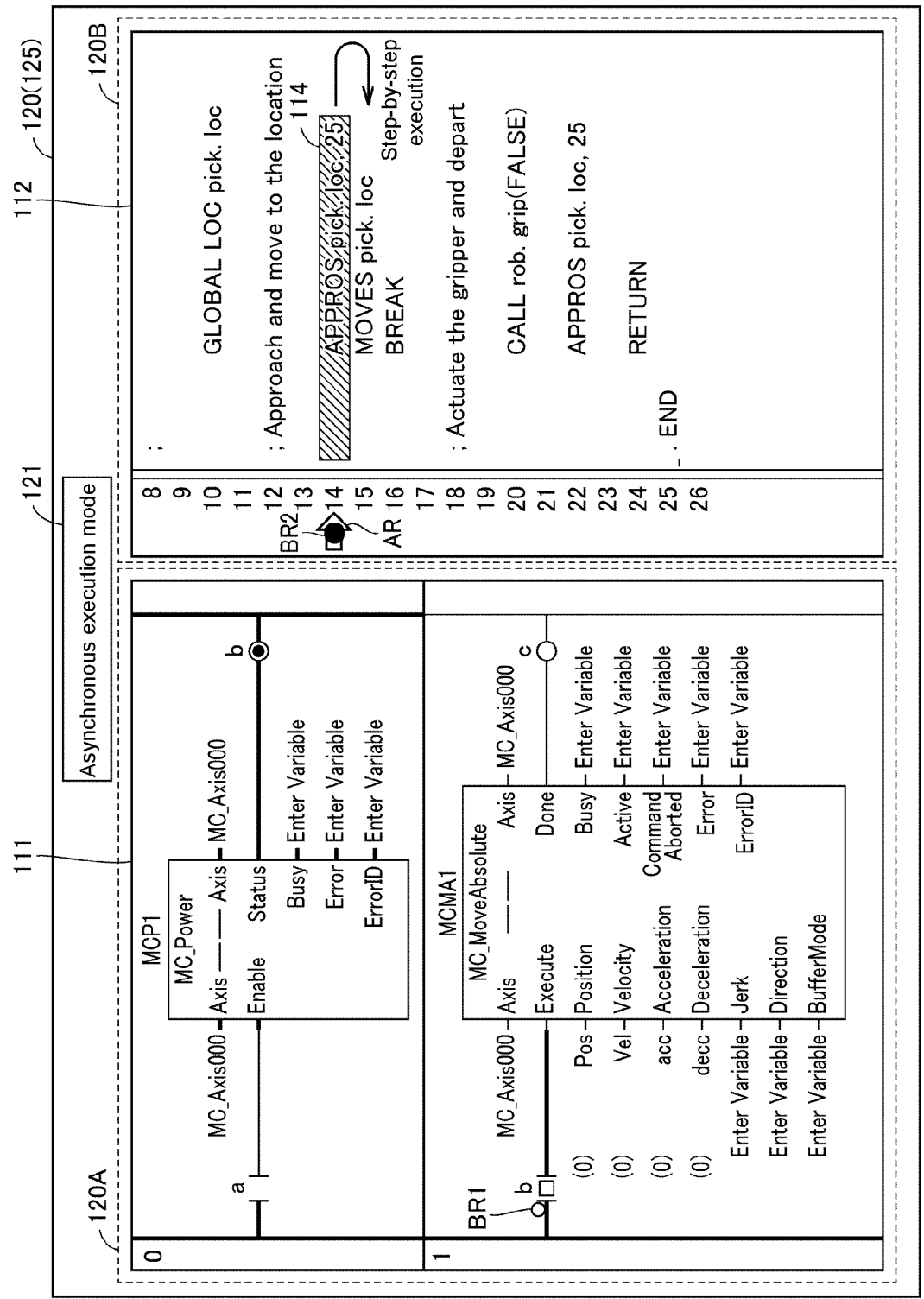
FIG. 7 is a diagram showing an example of the editing screen of the PLC program and the robot program.

The editing screen 125 is set such that a break point can be designated for an instruction group included in the PLC program 111 and an instruction group included in the robot program 112. That is, a user can designate a break point for an arbitrary instruction shown on the editing screen 125. In the examples of FIG. 6 and FIG. 7, a break point BR1 is designated for an input variable "b" of the PLC program 111, and a break point BR2 is designated for the 14th line of the robot program 112. In addition, a current execution target of the robot program 112 is indicated by an arrow AR.

The execution part 151A temporarily stops the execution of the PLC program 111 and the robot program 112 on the basis of the fact that an execution timing of an instruction for which the break point has been designated arrives. For example, the execution part 151A temporarily stops the execution of the PLC program 111 and the robot program 112 when a value of the variable "b" for which the break point BR1 has been designated changes from "0" to "1." Likewise, the execution part 151A temporarily stops the execution of the PLC program 111 and the robot program 112 when an execution timing of the instruction on the 14th line for which the break point BR2 has been designated arrives.

The editing screen 125 displays a value of each variable defined in the two control programs during the temporary stop of the execution. Accordingly, the architect can ascertain the value of the variable at the temporary stop timing, and can determine whether the two control programs are operating as intended.

[D. Execution Modes of Control Programs]

As described above, execution modes of the control programs for the execution part 151A include the "synchronous execution mode" in which the PLC program 111 and the robot program 112 are synchronously executed and the "asynchronous execution mode" in which the PLC program 111 and the robot program 112 are asynchronously executed.

Next, the synchronous execution mode and the asynchronous execution mode will be described below with reference to FIG. 4 to FIG. 7.

(D1. Synchronous Execution Mode)

Figure 4:
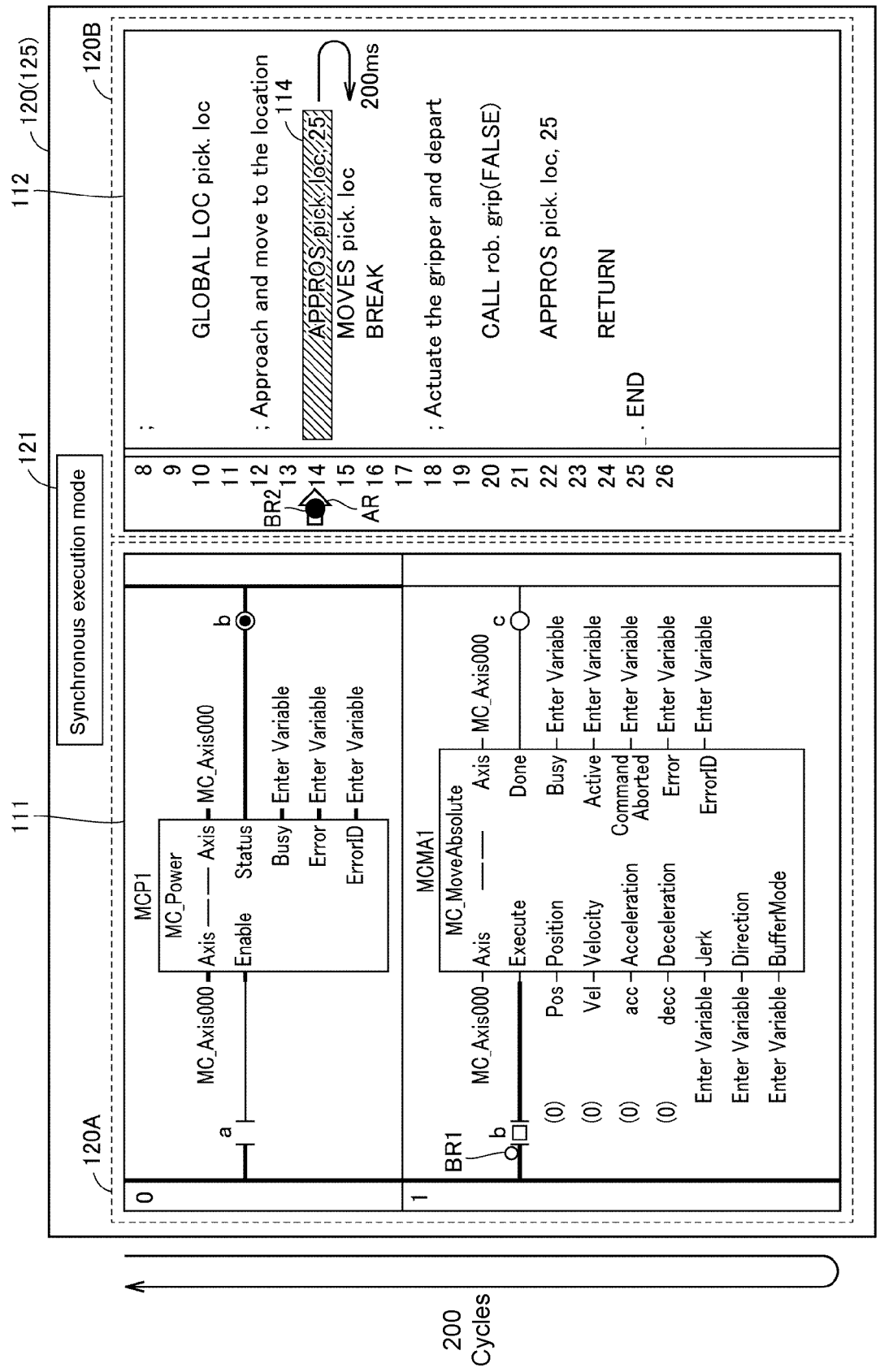
FIG. 4 is a diagram showing an example of an editing screen of a PLC program and a robot program.
Figure 5:
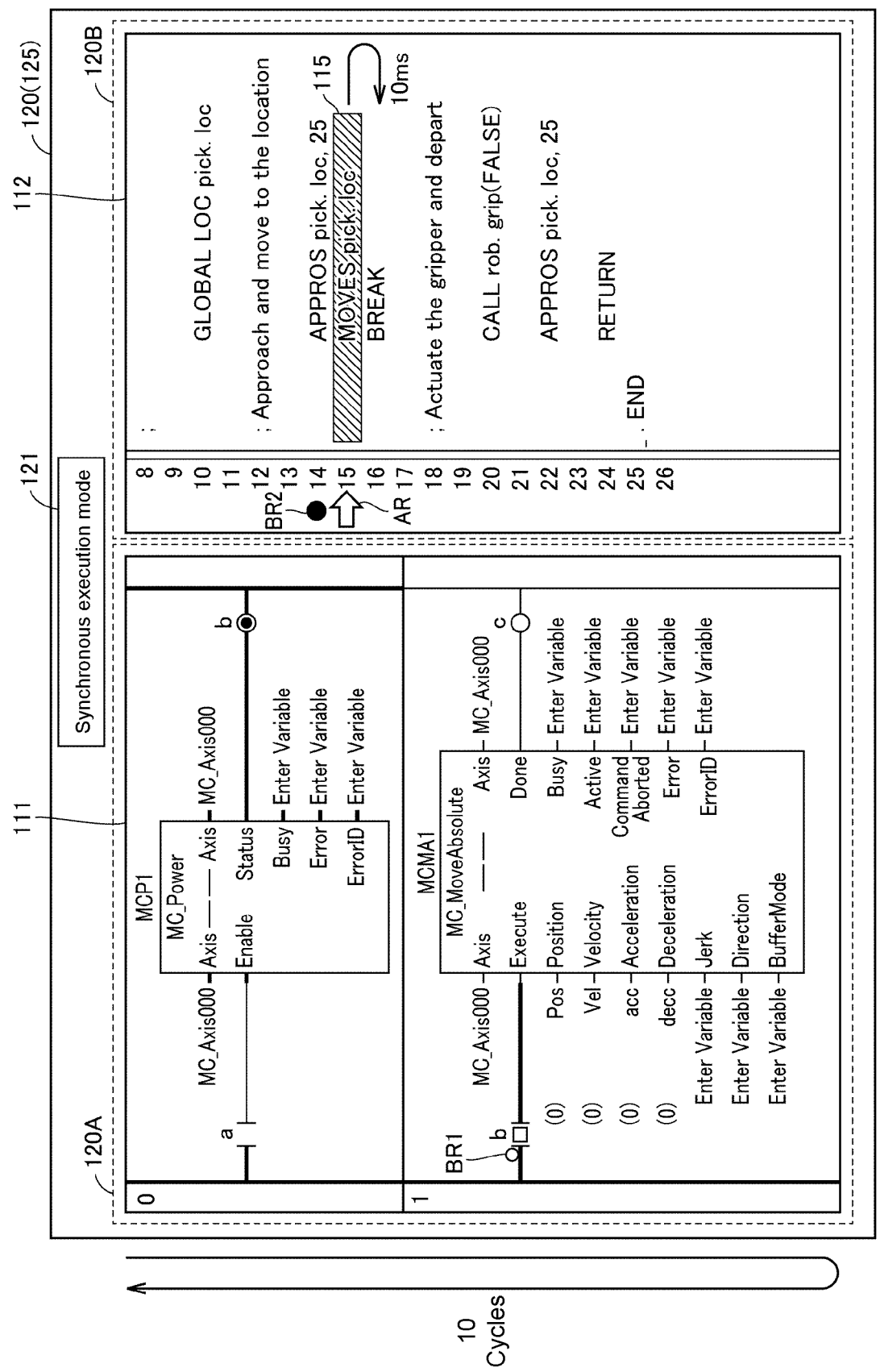
FIG. 5 is a diagram showing an example of the editing screen of the PLC program and the robot program.

First, execution aspects of the synchronous execution mode will be described with reference to FIG. 4 and FIG. 5.

As described above, the PLC program 111 is a cyclic execution type program. Thus, the trace computation part 152 (refer to FIG. 2) repeatedly executes the instruction group included in the PLC program 111 in predetermined control periods. More specifically, the trace computation part 152 executes the PLC program 111 from the top line to the bottom line in one control period. In the next control period, the trace computation part 152 executes the PLC program 111 from the top line to the bottom line again.

Meanwhile, the robot program 112 is a sequential execution type program. Thus, the interpretation part 154 (refer to FIG. 2) sequentially executes the instruction group included in the robot program 112 in a predetermined execution order. More specifically, the interpretation part 154 executes the robot program 112 line by line from the top in order. At this time, the interpretation part 154 does not execute the instruction of the next line before the execution of the instruction of each of lines is completed.

Based on the difference between the execution aspects described above, the instruction group of the PLC program 111 and the instruction group of the robot program 112 need to be executed in synchronized control periods to make the PLC program 111 and the robot program 112 be synchronously executed.

To realize synchronous execution, the interpretation part 154 calculates the number of cycles in a control period necessary for execution of the instructions included in the robot program 112 (the second control program). The number of cycles is calculated based on virtual times generated by the timer 140. The unit of virtual time is indicated by, for example, "ms." In the example of FIG. 4, the number of cycles lasting "200 ms" is specified for a robot instruction 114 indicated on the 14th line of the robot program 112. "APPROS pick loc, 25" indicated as the robot instruction 114 is a movement command for moving the arm robot 400 to a target position "25." By interpreting the movement instruction by the interpretation part 154, "200 ms" is specified for the number of cycles in the control period required for moving the arm robot 400 to the target position.

The trace computation part 152 repeatedly executes the instruction group included in the PLC program 111 for the time "200 ms" that is necessary for execution of the robot instruction 114 while the interpretation part 154 is executing the robot instruction 114. As an example, in a case in which the control period of the PLC program 111 is "1 ms," the trace computation part 152 repeatedly executes the PLC program 111 for 200 cycles (=200 ms/1 ms) while the robot instruction 114 is being executed.

After the trace computation part 152 repeats the instruction group included in the PLC program 111 for an execution time required for the execution of the robot instruction 114, the interpretation part 154 starts executing the next instruction to the robot instruction 114. An example thereof is shown in FIG. 5. In the example of FIG. 5, the interpretation part 154 switches control from the robot instruction 114 to a robot instruction 115. "MOVES pick.loc" indicated by the robot instruction 115 is a movement instruction for moving the arm robot to a target position "pick.loc." By interpreting the robot instruction 115 by the interpretation part 154, "10 ms" is specified for the number of cycles of the control period that is necessary for moving the arm robot 400 to the target position.

Thereafter, the trace computation part 152 repeatedly executes the instruction group included in the PLC program 111 for "10 ms" that is necessary for the execution of the robot instruction 115 while the interpretation part 154 is executing the robot instruction 115. As an example, in a case in which the control period of the PLC program 111 is "1 ms," the trace computation part 152 repeatedly executes the PLC program 111 for 10 cycles (=10 ms/1 ms) while the robot instruction 115 is being executed.

(D2. Asynchronous Execution Mode)

Next, execution aspects of the asynchronous execution mode will be described with reference to FIG. 6 and FIG. 7.

The asynchronous execution mode mentioned there refers to an execution aspect in which the PLC program 111 and the robot program 112 are executed without the programs being dependent on each other. That is, the execution aspects of the asynchronous execution mode include not only one in which the PLC program 111 and the robot program 112 are executed in parallel without synchronization but also one in which the PLC program 111 and the robot program 112 are individually executed. The asynchronous execution mode will be described below showing an example in which the PLC program 111 and the robot program 112 are individually executed.

In the examples of FIG. 6 and FIG. 7, the execution of the PLC program 111 and the robot program 112 has temporarily stopped on the basis of the fact that an execution timing of the robot instruction 114 for which the brake point BR2 is designated has arrived. At this time, the editing screen 125 is designed to allow the PLC program 111 and the robot program 112 to be individually subject to step-by-step execution in the asynchronous execution mode. The step-by-step execution in the PLC program 111 refers to execution of instructions in one control period. The step-by-step execution in the robot program 112 refers to execution of an instruction for one line.

FIG. 6 shows an example in which the PLC program 111 is subject to step-by-step execution. At this time, the robot program 112 has temporarily stopped. FIG. 7 shows an example in which the robot program 112 is subject to step-by-step execution. At this time, the PLC program 111 has temporarily stopped. As described above, an architect can perform step-by-step execution of the PLC program 111 and the robot program 112 individually in the asynchronous execution mode.

A method of designating a control program that is subject to step-by-step execution is arbitrary. For example, in a case in which a predetermined first operation (e.g., an operation of pressing a predetermined first key of a keyboard) is performed, the execution part 151A performs step-by-step execution of the PLC program 111. Meanwhile, in a case in which a predetermined second operation (e.g., an operation of pressing a predetermined second key that is different from the first key) is performed, the execution part 151A performs step-by-step execution of the robot program 112.

[E. Debugging Aspect]

Examples of debugging aspects of the PLC program 111 and the robot program 112 will be subsequently described below with reference to FIG. 4 to FIG. 7.

The editing screen 125 can designate whether the PLC program 111 and the robot program 112 are to be executed in the synchronous execution mode or in the asynchronous execution mode. The editing screen 125 switches between the execution modes, for example, in an alternating manner on the basis of the fact that a predetermined mode switching operation has been received. As an example, the execution modes are switched between through a clicking operation performed on the editing screen 125, a predetermined mouse gesture operation made on the editing screen 125, or the like. Display of the execution mode display area 121 is updated in connection with a mode switching operation.

An architect can debug the PLC program 111 and the robot program 112 in the synchronous execution mode and the asynchronous execution mode. As an example of a typical debugging aspect, the architect executes the two control programs in the synchronous execution mode up to a line immediately previous to a debugging line, and then switches to the asynchronous execution mode to cause only a debugging target control program to operate.

In order to handle the above-described debugging aspect, the execution part 151A executes the two control programs in the synchronous execution mode until an instruction for which the break point BR1 or the brake point BR2 has been designated is executed after the execution of the PLC program 111 and the robot program 112 starts. Accordingly, the architect can cause the control programs to precisely operate up to the line immediately previous to the debugging line.

When an execution timing of the instruction for which the break point BR1 or the brake point BR2 has been designated arrives, the execution part 151A temporarily stops the execution of the PLC program 111 and the robot program 112. The editing screen 125 is set such that any of the synchronous execution mode and the asynchronous execution mode can be selected during a temporary stop of the execution of the PLC program 111 and the robot program 112. As an example, the execution modes can be switched between through a clicking operation performed on the editing screen 125, a predetermined mouse gesture operation performed on the editing screen 125, or the like.

It can be assumed that the architect has selected the asynchronous execution mode during the temporary stop of the execution of the control programs. Accordingly, the architect can perform step-by-step execution of only a debugging target control program. As a result, the architect can efficiently debug the debugging target control program.

[F. Invalidation of Shared Variables and Synchronous Instruction]

Figure 8:
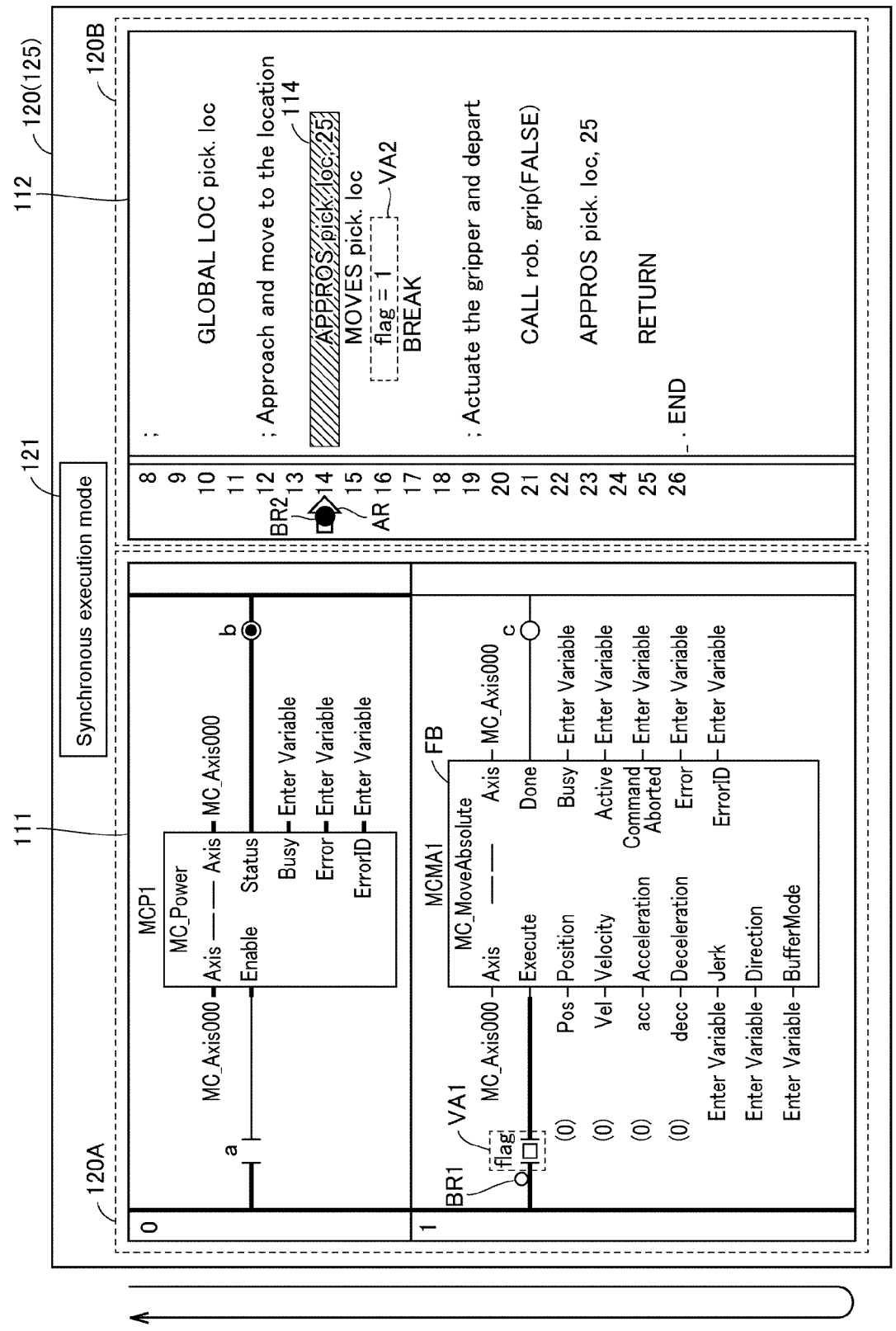
FIG. 8 is a diagram showing an example of the editing screen of the PLC program and the robot program.

FIG. 8 is a diagram showing an example of the editing screen 125 of the PLC program 111 and the robot program 112. Shared variables and an invalidation process of a synchronous instruction will be described with reference to FIG. 8.

The PLC program 111 and the robot program 112 include shared variables that are shared between the programs. The shared variables mentioned here are variables that change their values due to the influence of the other control program. FIG. 8 shows shared variables VA1 and VA2 as an example. In the example of FIG. 8, the shared variables VA1 and VA2 are denoted by the same variable name "flag." The shared variables VA1 and VA2 indicate the same value at all times. That is, when the shared variable VA1 is rewritten in the PLC program 111, the shared variable VA2 is rewritten as well in accordance with the shared variable VA1. On the other hand, when the shared variable VA2 is rewritten in the robot program 112, the shared variable VA1 is rewritten as well in accordance with the shared variable VA2.

The editing screen 125 can receive an operation of changing the shared variables VA1 and VA2 during a temporary stop of the execution of the PLC program 111 and the robot program 112 or during the execution of the PLC program 111 and the robot program 112. That is, the editing screen 125 allows manual input of values of the shared variables VA1 and VA2. For example, in a case in which the shared variables are variables taking one of binary values, the architect rewrites values by designating the shared variables through clicking or the like. Alternatively, the architect may designate the shared variables and then input the values. Accordingly, the architect can force an instruction of which execution starts in accordance with the values of the shared variables to be executed and thereby debugging efficiency is improved.

In addition, the PLC program 111 and the robot program 112 include a synchronous instruction synchronized with the other control program. The synchronous instruction mentioned is an instruction executed in synchronization with the other control program. FIG. 8 shows a function block FB serving as a synchronous instruction as an example. The function block FB causes an instruction defined inside to be executed in synchronization with an execution period of the robot program 112.

The editing screen 125 can receive an operation of invalidating the function block FB during the temporary stop of the execution of the PLC program 111 and the robot program 112 or the execution of the PLC program 111 and the robot program 112. For example, the architect can switch between validation and invalidation by designating the function block FB through clicking or the like. Accordingly, the function block FB is executed independently of the execution period of the other control program, and thus debugging efficiency is improved.

[G. Synchronous Output Process of Position Command Value]

To simulate a communication mode in EtherCAT, the first emulator 150 (refer to FIG. 2) outputs a position command value to the actuator emulator 155 in each control period predetermined in accordance with a communication period of EtherCAT. Likewise, the second emulator 160 (refer to FIG. 2) outputs a position command value to the actuator emulator 165 in each control period predetermined in accordance with the communication period of EtherCAT. Accordingly, an operation of the FA system 1 can be simulated in the same communication mode as in an actual system.

Figure 9:
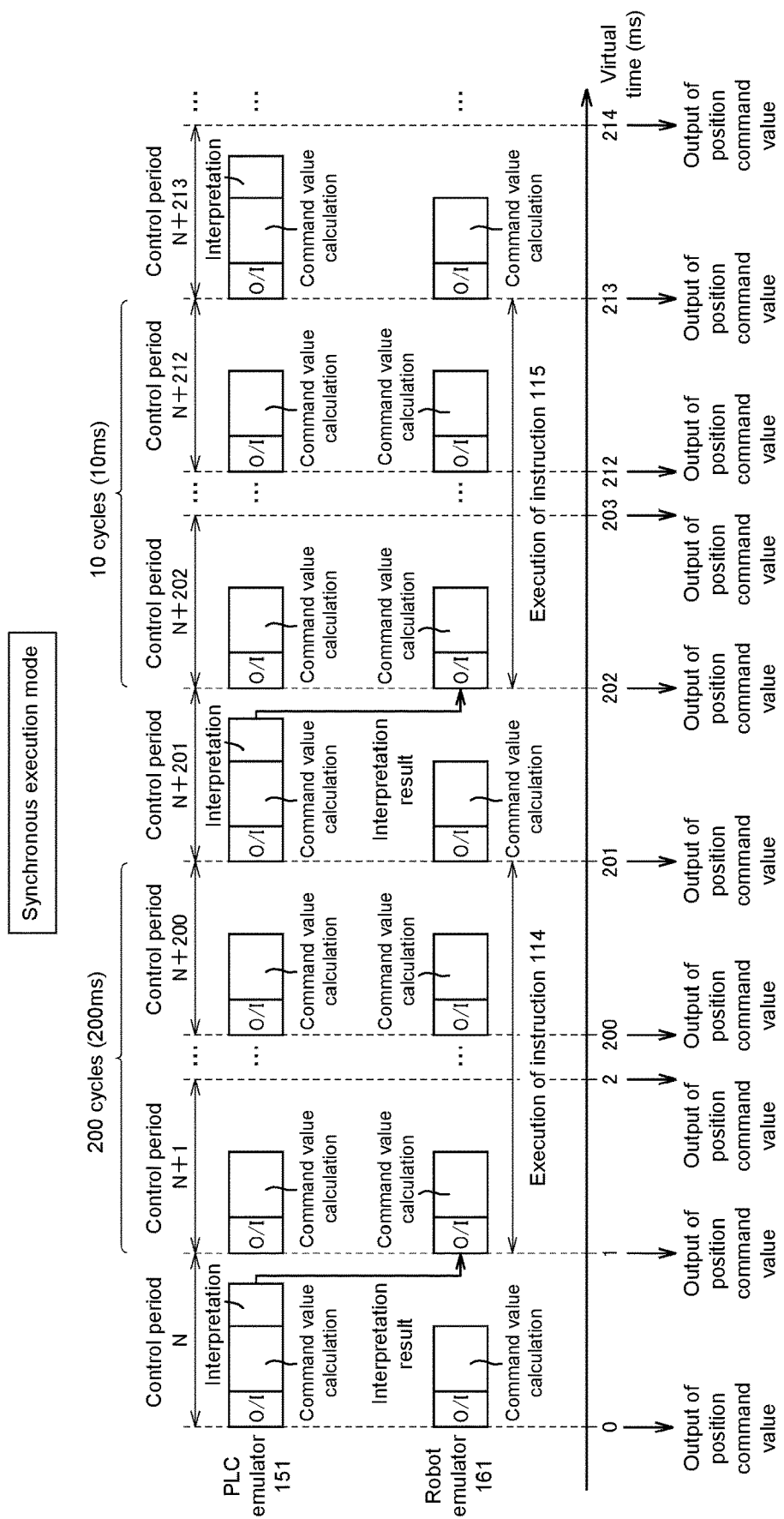
FIG. 9 is a diagram for describing a synchronization process of output timings of position command values for actuator emulators.

FIG. 9 is a diagram for describing a synchronization process of output timings of position command values with respect to the actuator emulators 155 and 165 (refer to FIG. 2). The synchronization process of the output timings of position command values will be described by exemplifying an execution procedure of the robot instructions 114 and 115 (refer to FIG. 4 and FIG. 5) included in the robot program 112 below.

In a control period "N," the first emulator 150 executes an output/input (O/I) process, a command value calculation process, and an interpretation process in that order. The second emulator 160 executes the O/I process and the command value calculation process in that order. The O/I process is a process of outputting the result of the previous command value calculation process, and then acquiring information necessary for the current command value calculation process as an input. The command value calculation process is a process of calculating position command values for the actuator emulators 155 and 165. The interpretation process is a process of interpreting the robot program 112. In the example of FIG. 9, "200 ms" is specified for the number of cycles of a control period necessary for execution of the robot instruction 114 included in the robot program 112 through the interpretation process.

The first emulator 150 repeatedly executes the PLC program 111 while the second emulator 160 is executing the robot instruction 114. In a case in which the control period is "1 ms," the first emulator 150 executes the PLC program 111 for 200 cycles (=200 ms/1 ms). During that time, the first emulator 150 executes the O/I process and the command value calculation process in each control period of "1 ms," and outputs a position command value to the actuator emulator 155 in each control period of "1 ms."

Meanwhile, the second emulator 160 executes the O/I process and the command value calculation process in each predetermined control period while the robot instruction 114 is being executed. In a case in which the control period is "1 ms," the second emulator 160 executes the O/I process and the command value calculation process in each control period of "1 ms," and outputs a position command value to the actuator emulator 165 in each control period of "1 ms."

In a control period "N+200" that is "200 ms" after the execution of the robot instruction 114, the execution of the robot instruction 114 is completed. In the next control period "N+201", the first emulator 150 executes the interpretation process of the next robot instruction 115. In the example of FIG. 9, "10 ms" is specified for the number of cycles of the control period necessary for execution of the robot instruction 115 included in the robot program 112 through the interpretation process.

The first emulator 150 repeatedly executes the PLC program 111 while the second emulator 160 is executing the robot instruction 115. In a case in which the control period is "1 ms," the first emulator 150 executes the PLC program 111 for 10 cycles (=10 ms/1 ms). During that time, the first emulator 150 executes the O/I process and the command value calculation process and outputs a position command value to the actuator emulator 155 in each control period of "1 ms."

Meanwhile, the second emulator 160 executes the O/I process and the command value calculation process in each predetermined control period while executing the robot instruction 115. In a case in which the control period is "1 ms," the second emulator 160 executes the O/I process and the command value calculation process in each control period of "1 ms" and outputs a position command value to the actuator emulator 165 in each control period of "1 ms."

As described above, since the position command values are output to each of the actuator emulators 155 and 165 with the first emulator 150 and the second emulator 160 synchronized with each other, control targets of different types (e.g., the arm robot, the moving table, and the like) can be synchronized.

Note that, although the example in which the control period of the first emulator 150 and the control period of the second emulator 160 are the same has been described above, these control periods may differ from each other as long as the control periods are synchronized. As an example, one of the control periods may be an integral multiple of the other control period. For example, the control period of the first emulator 150 may be "1 ms," and the control period of the second emulator 160 may be "2 ms."

[H. Simulation Screen]

Figure 10:
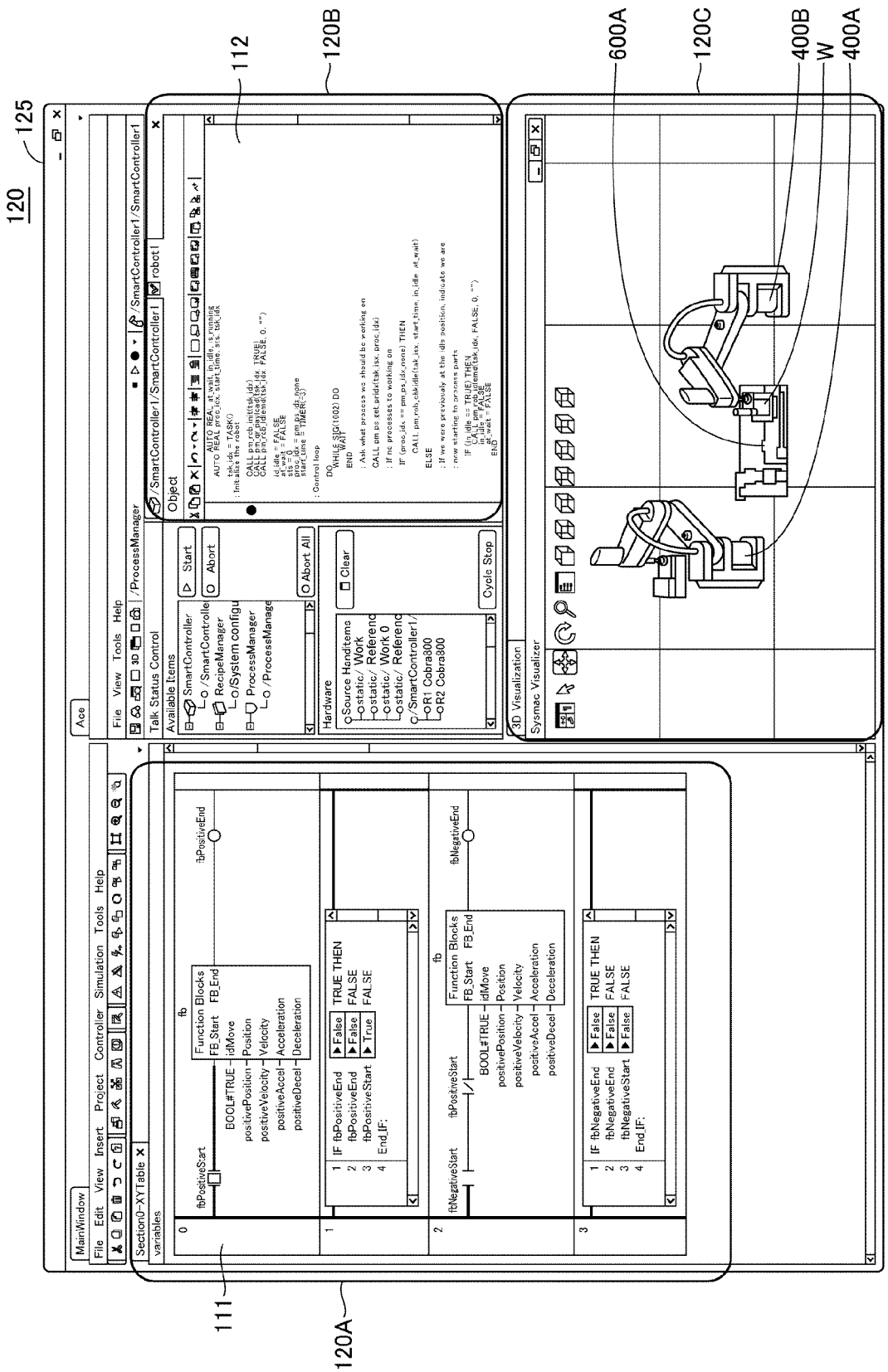
FIG. 10 is a diagram showing an example of a simulation screen of an information processing device according to an embodiment.

FIG. 10 shows an example of a simulation screen of the information processing device 100. The example of the simulation screen for realizing a synchronous simulation will be described with reference to FIG. 10.

The editing screen 125 for editing the PLC program 111 and the robot program 112 is shown on the display part 120 of the information processing device 100. The editing screen 125 includes the editing area 120A of the PLC program 111, the editing area 120B of the robot program 112, and a display area 120C in which an operation of a control target such as the arm robot or the moving table is displayed in real time.

The display area 120C shows robot images 400A and 400B indicating the actual aim robot 400 and a moving table image 600A indicating the actual moving table 600. The robot images 400A and 400B and the moving table images 600A are generated from, for example, a computer aided design (CAD) data, or the like. As an example, the information processing device 100 has a function of importing CAD data in a three-dimensional shape, and thus reads CAD data of the arm robot 400 and CAD data of the moving table 600 using the importing function. In a case in which the synchronous simulation is performed with respect to two arm robots 400 and the one moving table 600, the information processing device 100 generates three-dimensional data of the two arm robots from the CAD data of the arm robots 400 and three-dimensional data of the one moving table from the CAD data of the moving table 600.

As in the example of FIG. 10, in the case in which a simulation is performed with respect to the one moving table 600 and the two arm robots 400, one first emulator 150 and two second emulators 160 are used. As described above, the first emulator 150 and the second emulators 160 output position command values to corresponding actuator emulators in accordance with synchronized control periods. The information processing device 100 sequentially updates each piece of three-dimensional data of the arm robots and the three-dimensional data of the moving table based on the sequentially output position command values. The information processing device 100 sequentially updates display of the robot images 400A and 400B from each of the sequentially updated three-dimensional data of the aim robots. In synchronization with the updating, the information processing device 100 sequentially updates display of the moving table image 600A from the sequentially updated three-dimensional data of the moving table.

Accordingly, the display of the robot images 400A and 400B and the display of the moving table image 600A are synchronously updated in accordance with the execution of the PLC program 111 and the robot program 112. Accordingly, the architect can easily ascertain whether the PLC program 111 and the robot program 112 are operating as intended, and thus can easily debug the PLC program 111 and the robot program 112.

[I. Hardware Configuration of Information Processing Device 100]

Figure 11:
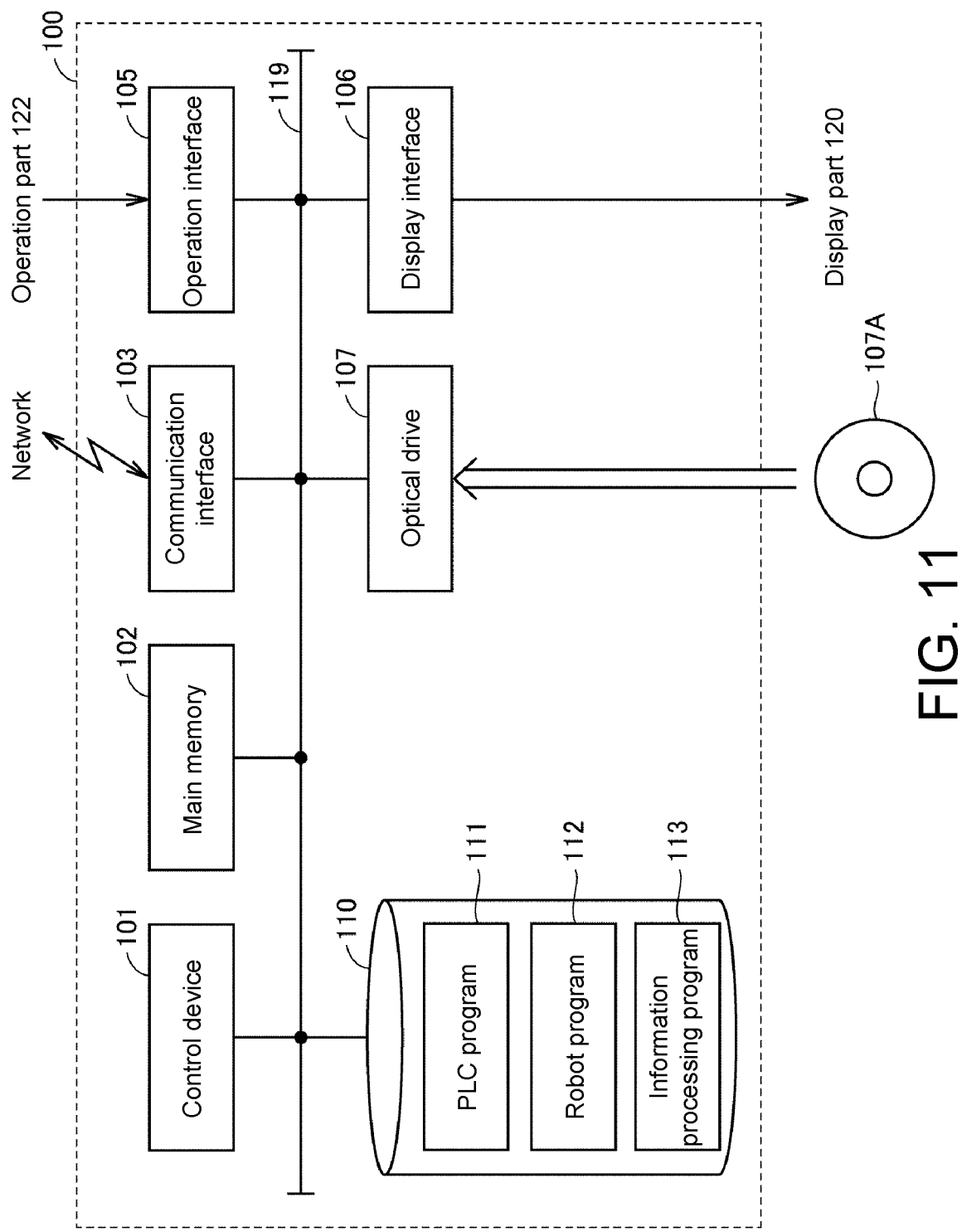
FIG. 11 is a schematic diagram showing a hardware configuration of the information processing device according to an embodiment.

A hardware configuration of the information processing device 100 will be described with reference to FIG. 11. FIG. 11 is a schematic diagram showing a hardware configuration of the information processing device 100.

The information processing device 100 is a computer configured according to general computer architecture as an example. The information processing device 100 includes a control device 101, a main memory 102, a communication interface 103, an operation interface 105, a display interface 106, an optical drive 107, and a storage device 110 (a storage part). These components are connected to one another via an internal bus 119 so as to communicate with each other.

The control device 101 is constituted by, for example, at least one integrated circuit. The integrated circuit is constituted by, for example, at least one central processing unit (CPU), at least one application specific integrated circuit (ASIC), at least one field programmable gate array (FPGA), a combination thereof, or the like. The control device 101 realizes various processes according to the present embodiment by developing and executing programs in the main memory 102. The main memory 102 is constituted by a volatile memory, and functions as a work memory that is necessary for the control device 101 to execute programs.

The communication interface 103 is for exchanging data with external apparatuses via a network. The external apparatuses include, for example, the above-described PLC 200 (refer to FIG. 1), a server, another communication apparatus, and the like. The information processing device 100 may be able to download an information processing program 113 via the communication interface 103. The information processing program 113 is a program for providing a comprehensive development environment for the PLC program 111 and the robot program 112, and provides a function of the above-described synchronous simulation process or the like.

The operation interface 105 is connected to an operation part 122 and takes in a signal indicating a user operation from the operation part 122. The operation part 122 typically includes a keyboard, a mouse, a touch panel, a touch pad, and the like, and receives operations from a user. The architect can edit the PLC program 111 and the information processing program 113 using the operation part 122.

The display interface 106 is connected to the display part 120, and transfers an image signal for displaying an image to the display part 120 in accordance with a command from the control device 101 or the like. The display part 120 is a display, an indicator, or the like, and presents various kinds of information to a user.

The optical drive 107 reads various programs stored in an optical disc 107A or the like therefrom and installs the programs in the storage device 110. The storage device 110 stores, for example, the information processing program 113 and the like.

Although FIG. 11 shows a configuration example in which the necessary programs are installed in the information processing device 100 via the optical drive 107, the disclosure is not limited thereto, and such programs may be downloaded from a server device on a network or the like. Alternatively, such programs to be executed on the information processing device 100 may be rewritten with a program written in a storage medium such as a universal serial bus (USB) memory, a secure digital (SD) card, CompactFlash (CF), or the like.

The storage device 110 is, for example, a hard disk or an external storage medium. As an example, the storage device 110 stores the PLC program 111 that is under development and the information processing program 113. The information processing program 113 may be provided to be incorporated into a part of an arbitrary program, rather than as a single program. In this case, the synchronization process according to the present embodiment is realized in cooperation with the arbitrary program. The program, despite the fact that it does not include such a partial module, does not impart from the gist of the information processing device 100 according to the present embodiment. Furthermore, some or all of functions provided by the information processing program 113 according to the present embodiment may be realized using dedicated hardware. Furthermore, the information processing device 100 may be in the form of a so-called cloud service in which at least one server realizes the synchronization process according to the present embodiment.

[J. Control Structure of Information Processing Device 100]

Figure 12:
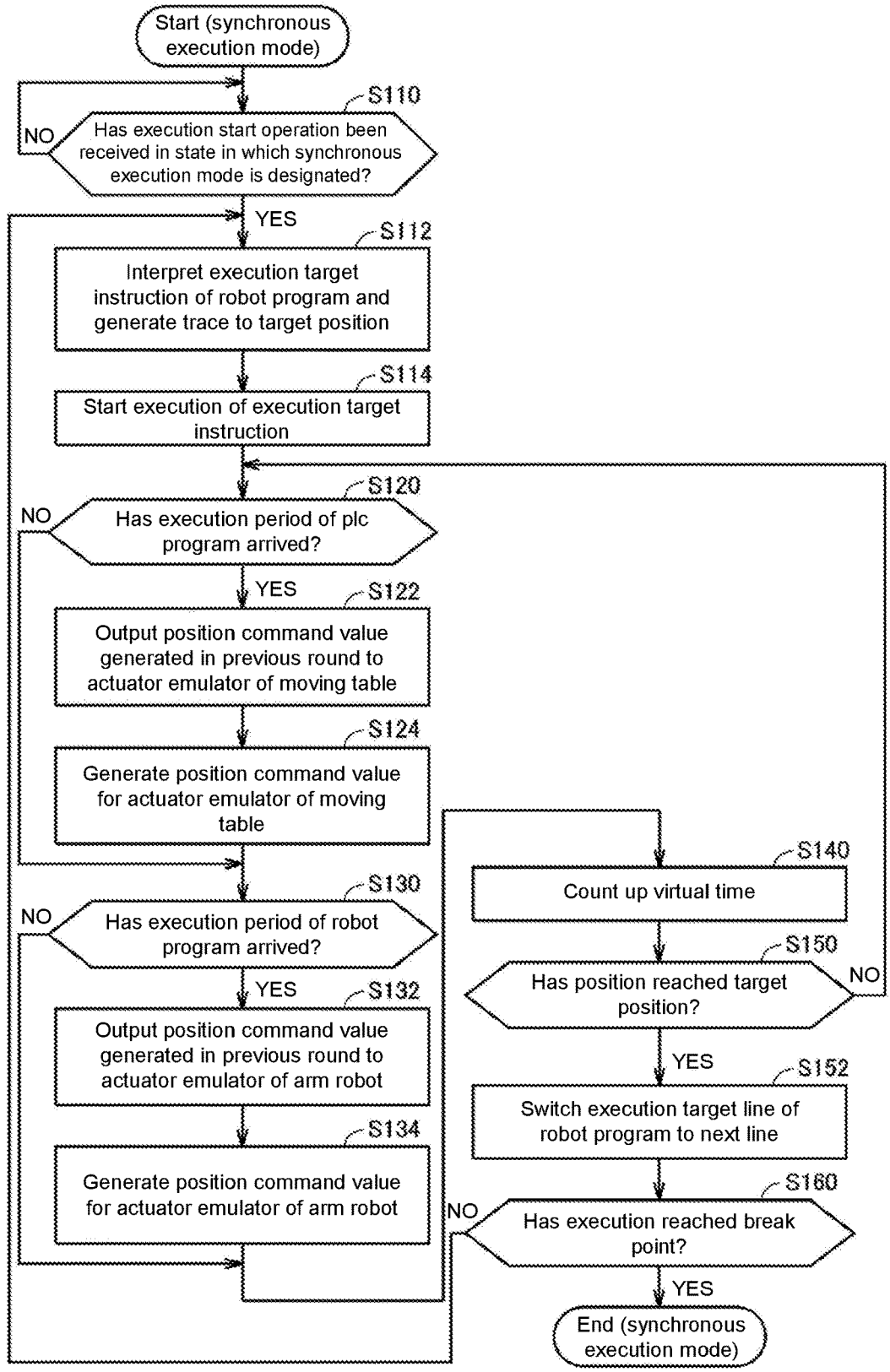
FIG. 12 is a flowchart showing an execution process of control programs in a synchronous execution mode.
Figure 13:
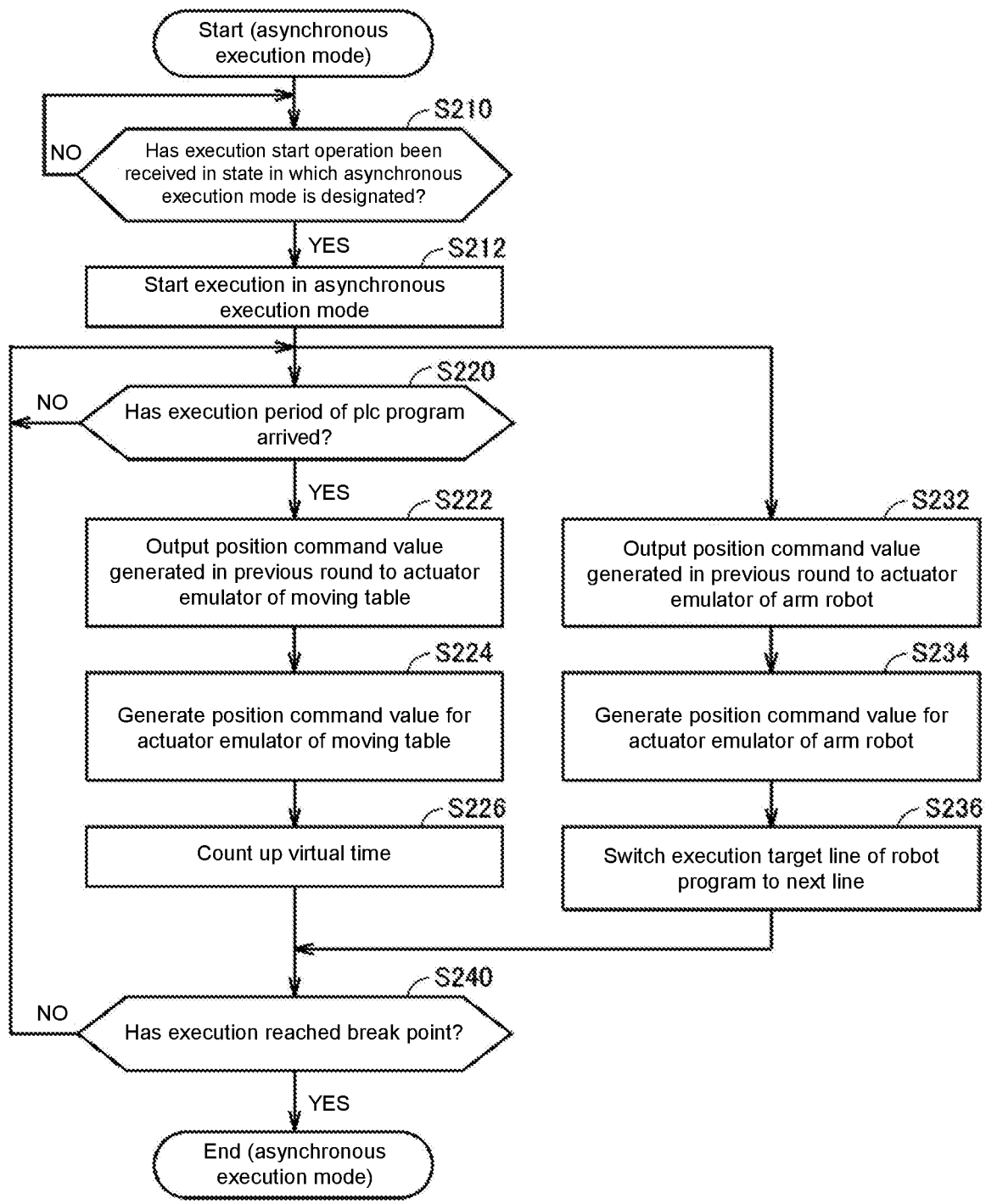
FIG. 13 is a flowchart showing an execution process of the control programs in an asynchronous execution mode.
Figure 14:
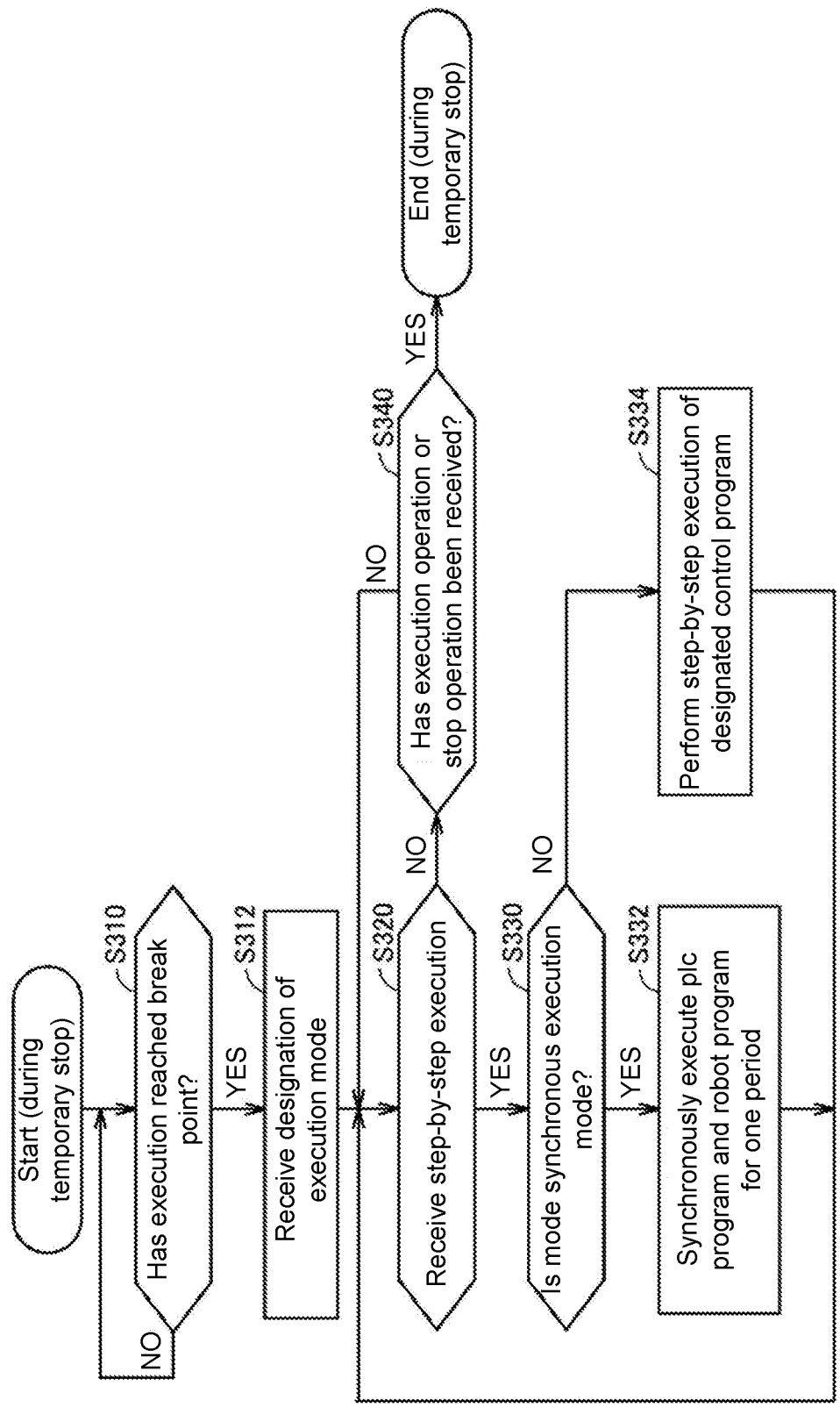
FIG. 14 is a flowchart showing a process performed during a temporary stop of the execution of the control programs.

Hardware configuration of the information processing device 100 will be described with reference to FIG. 12 to FIG. 14. FIG. 12 is a flowchart showing an execution process of the control programs in the synchronous execution mode. FIG. 13 is a flowchart showing an execution process of the control programs in the asynchronous execution mode. FIG. 14 is a flowchart showing a process performed during a temporary stop of the execution of the control programs. The processes of FIG. 12 to FIG. 14 are realized by the control device 101 of the information processing device 100 executing a program. In another aspect, some or entire processes may be executed by a circuit element or another piece of hardware.

(J1. Control Flow in Synchronous Execution Mode)

First, a control flow in the synchronous execution mode will be described with reference to FIG. 12.

In Step S110, the control device 101 determines whether an operation of starting execution of the control programs has been received in a state in which the synchronous execution mode is designated. If it is determined that an operation of starting execution of the control programs has been received in the state in which the synchronous execution mode is designated (YES in Step S110), the control device 101 switches control to Step S112. If it is not (NO in Step S110), the control device 101 executes the process of Step S110 again.

In Step S112, the control device 101 interprets a robot instruction indicated on an execution target line of the robot program 112, serving as the above-described interpretation part 154 (refer to FIG. 2), and executes a trace computation for driving the actuator emulator 155 in a simulation. The number of cycles necessary for executing the robot instruction indicated on the execution target line is specified from the computation result.

In Step S114, the control device 101 functions as the robot controller emulator 161 that simulates an operation of the robot controller 300, and starts executing the robot instruction that is the execution target.

In Step S120, the control device 101 determines whether an execution period of the PLC program 111 has arrived based on a virtual time indicated by the timer 140. If it is determined that an execution period of the PLC program 111 has arrived (YES in Step S120), the control device 101 switches control to Step S122. If it is not (NO in Step S120), the control device 101 switches control to Step S130.

In Step S122, the control device 101 outputs the position command value generated in Step S124 of the previous round to the actuator emulator 155 of the moving table 600. That is, the position command value generated in Step S124 of the succeeding round is output to the actuator emulator 155 when Step S122 is executed in the next round.

In Step S124, the control device 101 generates a position command value to be output to the actuator emulator 155 of the moving table 600, serving as the above-described command value generation part 153 (refer to FIG. 2). Since the method of generating the position command value is as described in FIG. 3, description thereof will not be repeated.

In Step S130, the control device 101 determines whether an execution period of the robot program 112 has arrived based on a virtual time indicated by the timer 140. Note that, in a case in which the execution period of the PLC program 111 is the same as the execution period of the robot program 112, the determination process of Step S130 may be omitted. If it is determined that an execution period of the robot program 112 has arrived (YES in Step S130), the control device 101 switches control to Step S132. If it is not (NO in Step S130), the control device 101 switches control to Step S140.

In Step S132, the control device 101 outputs the position command value generated in Step S134 of the previous round to the actuator emulator 165 of the arm robot 400. That is, the position command value generated in Step S134 of the succeeding round is output to the actuator emulator 165 when Step S132 is executed in the next round.

In Step S134, the control device 101 functions as the PLC emulator 151 that simulates an operation of the robot controller 300, and generates a position command value to be output to the actuator emulator 155 of the arm robot 400 in accordance with the trace generated in Step S112, serving as the above-described command value generation part 163 (refer to FIG. 2). Since the method for generating the position command value is as described in FIG. 3, description thereof will not be repeated.

In Step S140, the control device 101 counts up virtual times of the timer 140. Virtual times are counted up, for example, by 1 ms.

In Step S150, the control device 101 determines whether the position of the arm robot that is driven in the simulation by the actuator emulator 165 has reached a target position. If it is determined that the position of the arm robot driven in the simulation by the actuator emulator 165 has reached the target position (YES in Step S150), the control device 101 switches control to Step S152. If it is not (NO in Step S150), the control device 101 returns control to Step S120.

In Step S152, the control device 101 switches the execution target line of the robot program 112 to the next line, serving as the above-described interpretation part 154.

In Step S160, the control device 101 determines whether the execution of any of the PLC program 111 and the robot program 112 has reached a break point. If it is determined that the execution of any of the PLC program 111 and the robot program 112 has reached a break point (YES in Step S160), the control device 101 ends the process shown in FIG. 12. If it is not (NO in Step S160), the control device 101 returns control to Step S112.

(J2. Control Flow in Asynchronous Execution Mode)

Next, a control flow in the asynchronous execution mode will be described with reference to FIG. 13.

In Step S210, the control device 101 determines whether an operation of starting execution of the control programs has been received in a state in which the asynchronous execution mode is designated. If it is determined that an operation of starting execution of the control programs has been received in a state in which the asynchronous execution mode is designated (YES in Step S210), the control device 101 switches control to Step S212. If it is not (NO in Step S210), the control device 101 executes the process of Step S210 again.

In Step S212, the control device 101 starts execution of the control programs in the asynchronous execution mode. Accordingly, the execution of the PLC program 111 and execution of the robot program 112 start in parallel. The execution process of the PLC program 111 is realized in Steps S220, S222, S224, and S226. The execution process of the robot program 112 is realized in Steps S232, S234, and S236.

In Step S220, the control device 101 determines whether an execution period of the PLC program 111 has arrived based on a virtual time indicated by the timer 140. If it is determined that an execution period of the PLC program 111 has arrived (YES in Step S220), the control device 101 switches control to Step S222. If it is not (NO in Step S220), the control device 101 executes the process of Step S220 again.

In Step S222, the control device 101 outputs the position command value generated in Step S224 of the previous round to the actuator emulator 155 of the moving table 600. That is, a position command value generated in Step S224 of the succeeding round is output to the actuator emulator 155 when Step S222 is executed in the next round.

In Step S224, the control device 101 executes a robot instruction indicated on an execution target line of the robot program 112 and generates a position command value to be output to the actuator emulator 155 of the moving table 600, serving as the above-described command value generation part 153 (refer to FIG. 2). Since the method for generating the position command value is as described in FIG. 3, description thereof will not be repeated.

In Step S226, the control device 101 counts up virtual times of the timer 140. Virtual time is counted up, for example, by 1 ms.

In Step S232, the control device 101 outputs the position command value generated in Step S234 of the previous round to the actuator emulator 165 of the arm robot 400. That is, a position command value generated in Step S234 of the succeeding round is output to the actuator emulator 165 when Step S232 is executed in the next round.

In Step S234, the control device 101 functions as the PLC emulator 151 that simulates an operation of the robot controller 300, and generates the position command value to be output to the actuator emulator 155 of the arm robot 400, serving as the above-described command value generation part 163 (refer to FIG. 2). Since the method for generating the position command value is as described in FIG. 3, description thereof will not be repeated.

In Step S236, the control device 101 switches the execution target line of the robot program 112 to the next line, serving as the above-described interpretation part 154.

In Step S240, the control device 101 determines whether the execution of any of the PLC program 111 and the robot program 112 has reached a break point. If it is determined that the execution of any of the PLC program 111 and the robot program 112 has reached a break point (YES in Step S240), the control device 101 ends the process shown in FIG. 13. If it is not (NO in Step S240), the control device 101 returns control to Step S220.

(J3. Control Flow During Temporary Stop)

Next, a control flow during a temporary stop of the execution of the PLC program 111 and the robot program 112 will be described with reference to FIG. 14.

In Step S310, the control device 101 determines whether the execution of the PLC program 111 and the robot program 112 has temporarily stopped. If the execution of the PLC program 111 and the robot program 112 has temporarily stopped (YES in Step S310), the control device 101 switches control to Step S312. If it is not (NO in Step S310), the control device 101 executes the process of Step S310 again.

In Step S312, the control device 101 receives designation of the synchronous execution mode or the asynchronous execution mode. The operation of switching an execution mode is performed on, for example, the editing screen 125. As an example, an execution mode is designated through a clicking operation performed on the editing screen 125, a predetermined mouse gesture operation made on the editing screen 125, or the like.

In Step S320, the control device 101 determines whether an operation for performing step-by-step execution has been received. The step-by-step execution is realized through, for example, an operation of pressing a predetermined key of a keyboard or the like. If it is determined that an operation for performing step-by-step execution has been received (YES in Step S320), the control device 101 switches control to Step S330. If it is not (NO in Step S320), the control device 101 switches control to Step S340.

In Step S330, the control device 101 determines whether the designated execution mode is the synchronous execution mode. If it is determined that the designated execution mode is the synchronous execution mode (YES in Step S330), the control device 101 switches control to Step S332. If it is not (NO in Step S330), the control device 101 switches control to Step S334.

In Step S332, the control device 101 synchronously executes the PLC program 111 and the robot program 112 for one period. Since this synchronous execution is as described FIG. 12, description thereof will not be repeated.

In Step S334, the control device 101 performs step-by-step execution of one designated control program between the PLC program 111 and the robot program 112. The control program for the step-by-step execution is distinguished by the content of the operation for the step-by-step execution in Step S320. As an example, if a predetermined first operation for performing step-by-step execution (e.g., an operation of pressing a predetermined first key of the keyboard) has been received in Step S320, the control device 101 executes step-by-step execution of the PLC program 111. On the other hand, if a predetermined second operation for performing step-by-step execution (e.g., an operation of pressing a predetermined second key different from the first key) has been received in Step S320, the control device 101 performs step-by-step execution of the robot program 112.

In Step S340, the control device 101 determines whether a re-execution operation or a stop operation of the control program has been received. If it is determined that a re-execution operation or a stop operation of the control program has been received (YES in Step S340), the control device 101 ends the process shown in FIG. 14. If it is not (NO in Step S340), the control device 101 returns control to Step S320.

More specifically, in the case in which a re-execution operation of the control program has been received when the synchronous execution mode is designated, the control device 101 ends the process shown in FIG. 14, and starts execution of the process in the synchronous execution mode shown in FIG. 12. In addition, in the case in which a re-execution operation of the control program has been received when the asynchronous execution mode is designated, the control device 101 ends the process shown in FIG. 14 and starts execution of the process in the asynchronous execution mode shown in FIG. 13. In addition, in the case in which a stop operation of the control program has been received, the control device 101 ends the process shown in FIG. 14, and enters a state in which the control program can be edited on the editing screen 125.

[K. Conclusion]

As described above, the execution mode of the programs for the information processing device 100 includes the synchronous execution mode in which the PLC program 111 and the robot program 112 are synchronously executed in accordance with virtual times and the asynchronous execution mode in which the PLC program 111 and the robot program 112 are asynchronously executed. Accordingly, an architect can synchronously and asynchronously debug (simulate) the PLC program 111 and the robot program 112. As a result, the architect can debug (simulate) the programs according to circumstances, and versatility of debugging (simulation) is improved.

It should be considered that the embodiments disclosed above are illustrative, and not limitative. The scope of the disclosure is defined based on the claims, not the above description, and meanings equivalent to the claims and all modifications made within the claims are intended to be included in the scope of the disclosure.

What is claimed is:

1. An information processing device comprising:
a first actuator emulator that simulates a behavior of a drive apparatus that is for driving a first control target;
a second actuator emulator that simulates a behavior of a drive apparatus that is for driving a second control target that cooperates with the first control target;
a timer for generating a virtual time; and
an execution part for executing a first control program for controlling the first actuator emulator and a second control program for controlling the second actuator emulator,
wherein the second control program is written in a different type of programming language from that of the first control program, and
wherein execution modes of control programs used by the execution part include a synchronous execution mode in which the first control program and the second control program are synchronously executed in accordance with the virtual time and an asynchronous execution mode in which the first control program and the second control program are asynchronously executed,
wherein the execution part is configured to:
execute the first control program and the second control program in the synchronous execution mode until an instruction for which a break point is designated is executed,
temporarily stop the execution of the first control program and the second control program when an execution timing of the instruction for which the break point is designated arrives, and
switch, during the temporary stop, the execution mode from synchronous execution mode to the asynchronous execution mode based on a user selection received, wherein in the asynchronous execution mode the first control program and the second control program are executed further, after the temporary stop, in parallel without synchronization or only one of the first control program and the second control program is executed further, after the temporary stop, while the other of the first control program and the second control program continues to be stopped.

2. The information processing device according to claim 1, further comprising:
a display part for displaying an editing screen of the first control program and the second control program, and
wherein the editing screen is set such that a break point can be designated for an instruction group included in the first control program and an instruction group included in the second control program.

3. The information processing device according to claim 2, wherein the execution part executes the first control program and the second control program in the synchronous execution mode until the instruction designated by the break point is executed after the execution of the first control program and the second control program is started.

4. The information processing device according to claim 3, wherein the editing screen is set such that one of the synchronous execution mode and the asynchronous execution mode can be selected during the temporary stop of the execution of the first control program and the second control program.

5. The information processing device according to claim 4, wherein, in a case in which the asynchronous execution mode is selected during the temporary stop of the execution of the first control program and the second control program, the editing screen enables the first control program and the second control program to be individually subject to step-by-step execution.

6. The information processing device according to claim 4,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

7. The information processing device according to claim 3, wherein, in a case in which the asynchronous execution mode is selected during the temporary stop of the execution of the first control program and the second control program, the editing screen enables the first control program and the second control program to be individually subject to step-by-step execution.

8. The information processing device according to claim 7,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

9. The information processing device according to claim 3,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

10. The information processing device according to claim 2, wherein the editing screen is set such that one of the synchronous execution mode and the asynchronous execution mode can be selected during the temporary stop of the execution of the first control program and the second control program.

11. The information processing device according to claim 10, wherein, in a case in which the asynchronous execution mode is selected during the temporary stop of the execution of the first control program and the second control program, the editing screen enables the first control program and the second control program to be individually subject to step-by-step execution.

12. The information processing device according to claim 11,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

13. The information processing device according to claim 10,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

14. The information processing device according to claim 2, wherein, in a case in which the asynchronous execution mode is selected during the temporary stop of the execution of the first control program and the second control program, the editing screen enables the first control program and the second control program to be individually subject to step-by-step execution.

15. The information processing device according to claim 14,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

16. The information processing device according to claim 2,
wherein the first control program and the second control program include a shared variable that is shared between the programs, and
wherein the editing screen can receive an operation of changing the shared variable during the temporary stop of the execution of the first control program and the second control program or during the execution of the first control program and the second control program.

17. The information processing device according to claim 2,
wherein at least one of the first control program and the second control program includes a synchronous instruction that is executed in synchronization with the other control program, and
wherein the editing screen can receive an operation of invalidating the synchronous instruction during the temporary stop of the execution of the first control program and the second control program or during the execution of the first control program and the second control program.

18. The information processing device according to claim 1,
wherein the first control program is a cyclic execution type program, and
wherein the second control program is a sequential execution type program.

19. An information processing method comprising:
a step of generating a virtual time; and
an execution step of executing a first control program for controlling a first actuator emulator that simulates a behavior of a drive apparatus that is for driving a first control target and a second control program for controlling a second actuator emulator that simulates a behavior of a drive apparatus that is for driving a second control target that cooperates with the first control target,
wherein the second control program is described in a different type of programming language from that of the first control program, and
wherein execution modes of control programs used in the execution step include a synchronous execution mode in which the first control program and the second control program are synchronously executed in accordance with the virtual time and an asynchronous execution mode in which the first control program and the second control program are asynchronously executed,
wherein in the execution step:
the first control program and the second control program are executed in the synchronous execution mode until an instruction for which a break point is designated is executed,
wherein the information processing method further comprises:
temporarily stopping the execution of the first control program and the second control program when an execution timing of the instruction for which the break point is designated arrives, and
switching, during the temporary stop, the execution mode from synchronous execution mode to the asynchronous execution mode based on a user selection received, wherein in the asynchronous execution mode the first control program and the second control program are executed further, after the temporary stop, in parallel without synchronization or only one of the first control program and the second control program is executed further, after the temporary stop, while the other of the first control program and the second control program continues to be stopped.

20. A non-transitory computer-readable recording medium comprising an information processing program executed by a computer, the information processing program causing the computer to execute:
  the information processing method according to claim 19.

* * * * *